US012802112B2

(12) United States Patent
Lin

(10) Patent No.: US 12,802,112 B2
(45) Date of Patent: Nov. 17, 2026

(54) INFORMATION COMPARISON AND MATCHING METHOD AND APPARATUS BASED ON DESKTOP FUNCTIONAL COMPONENTS, USER TERMINAL, AND STORAGE MEDIUM

(71) Applicant: TENCENT TECHNOLOGY (SHENZHEN) COMPANY LIMITED, Shenzhen (CN)

(72) Inventor: Jiexian Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 295 days.

(21) Appl. No.: 18/458,460

(22) Filed: Aug. 30, 2023

(65) Prior Publication Data

US 2023/0410188 A1 Dec. 21, 2023

Related U.S. Application Data

(63) Continuation of application No. PCT/CN2023/082726, filed on Mar. 21, 2023.

(30) Foreign Application Priority Data

Mar. 25, 2022 (CN) ........................ 202210307459.0

(51) Int. Cl.
*G06Q 30/0601* (2023.01)
*G06F 3/0486* (2013.01)

(52) U.S. Cl.
CPC ....... *G06Q 30/0625* (2013.01); *G06F 3/0486* (2013.01)

(58) Field of Classification Search
None
See application file for complete search history.

(56) References Cited

U.S. PATENT DOCUMENTS 7,107,226 B1 9/2006 Cassidy et al.
11,635,889 B1 * 4/2023 Swanson ............. G06F 16/9577 715/764

(Continued)

FOREIGN PATENT DOCUMENTS

CN 111062787 A 4/2020
CN 113011955 A 6/2021

(Continued)

OTHER PUBLICATIONS

Method for Virtual Coordination covering Multiple On-Line Shopping Systems (Year: 2001).*

(Continued)

*Primary Examiner* — Victoria E. Frunzi
(74) *Attorney, Agent, or Firm* — ANOVA LAW GROUP, PLLC

(57) ABSTRACT

In an information comparison and matching method, a first functional component for a first functional module of a first application is generated; and a second functional component for a second functional module of a second application is generated. The first functional component includes first information of the first functional module, the second functional component includes second information of the second functional module. Further, an instruction for matching the first functional component with the second functional component is obtained. A matching result corresponding to the instruction is outputted.

17 Claims, 20 Drawing Sheets

(56) References Cited

U.S. PATENT DOCUMENTS

| | | | | |
|---|---|---|---|---|
| 2017/0091208 | A1* | 3/2017 | Quan | G06F 16/44 |
| 2017/0148046 | A1* | 5/2017 | Akbarpour Mashadi | G06Q 30/0629 |
| 2019/0020615 | A1* | 1/2019 | Golden | H04L 65/1069 |
| 2022/0100326 | A1* | 3/2022 | Sukhyani | G06F 3/04842 |

FOREIGN PATENT DOCUMENTS

| | | | |
|---|---|---|---|
| CN | 113407086 | A | 9/2021 |
| CN | 113724029 | A | 11/2021 |
| CN | 113961377 | A | 1/2022 |
| WO | 2009044992 | A1 | 4/2009 |

OTHER PUBLICATIONS

The World Intellectual Property Organization (WIPO) International Search Report for PCT/CN2023/082726 Jun. 9, 2023 10 Pages (including translation).

China National Intellectual Property Administration (CNIPA) Office Action 1 for 202210307459.0 Jul. 12, 2025 49 Pages (including translation).

* cited by examiner

INFORMATION COMPARISON AND MATCHING METHOD AND APPARATUS BASED ON DESKTOP FUNCTIONAL COMPONENTS, USER TERMINAL, AND STORAGE MEDIUM

CROSS-REFERENCES TO RELATED APPLICATIONS

This application is a continuation application of PCT Patent Application No. PCT/CN2023/082726, filed on Mar. 21, 2023, which claims priority to Chinese Patent Application No. 202210307459.0, filed on Mar. 25, 2022, all of which is incorporated herein by reference in their entirety.

FIELD OF THE TECHNOLOGY

The present disclosure relates to the field of computer technologies and, more particularly, to an information processing method and apparatus, a user terminal, a program product, and a storage medium.

BACKGROUND OF THE DISCLOSURE

Electronic products, such as a mobile phone, a tablet, a computer, and a television have become an indispensable part in modern society, playing an important role in various aspects, such as communication, cultural education, and entertainment.

The electronic products can display multimedia information such as images, texts, audios, and videos through various rich applications. If a user intends to obtain information from an application, the user needs to open the application to search for and view the information displayed in a corresponding functional module, and perform operations on the corresponding functional module. In some electronic products, there are also plugins that can display information of some commonly used functional modules of software on desktops or homepages of the electronic products, so that the user can view the information of the functional module more conveniently and quickly. However, the user can only view information of the functional module that is preset by an application manufacturer, and cannot directly process the information in these functional modules on the desktop in diversified manners.

SUMMARY

An embodiment of the present disclosure provides an information processing method performed by a user terminal. The method includes: generating a first functional component for a first functional module of a first application, the first functional component comprising first information of the first functional module; generating a second functional component for a second functional module of a second application, the second functional component comprising second information of the second functional module; obtaining an instruction for matching the first functional component with the second functional component; and outputting a matching result corresponding to the instruction.

Another embodiment of the present disclosure provides a user terminal. The user terminal includes one or more processors and one or more memories storing a computer-executable program that, when being executed, causes the one or more processors to perform an information processing method. The method includes: generating a first functional component for a first functional module of a first application, the first functional component comprising first information of the first functional module; generating a second functional component for a second functional module of a second application, the second functional component comprising second information of the second functional module; obtaining an instruction for matching the first functional component with the second functional component; and outputting a matching result corresponding to the instruction.

Another embodiment of the present disclosure provides a non-transitory computer-readable storage medium, storing a computer-executable instruction that, when being executed, causes one or more processors to perform an information processing method. The method includes: generating a first functional component for a first functional module of a first application, the first functional component comprising first information of the first functional module; generating a second functional component for a second functional module of a second application, the second functional component comprising second information of the second functional module; obtaining an instruction for matching the first functional component with the second functional component; and outputting a matching result corresponding to the instruction.

BRIEF DESCRIPTION OF THE DRAWINGS

In order to describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative work. In the accompanying drawings here.

DESCRIPTION OF EMBODIMENTS

Figure 1:
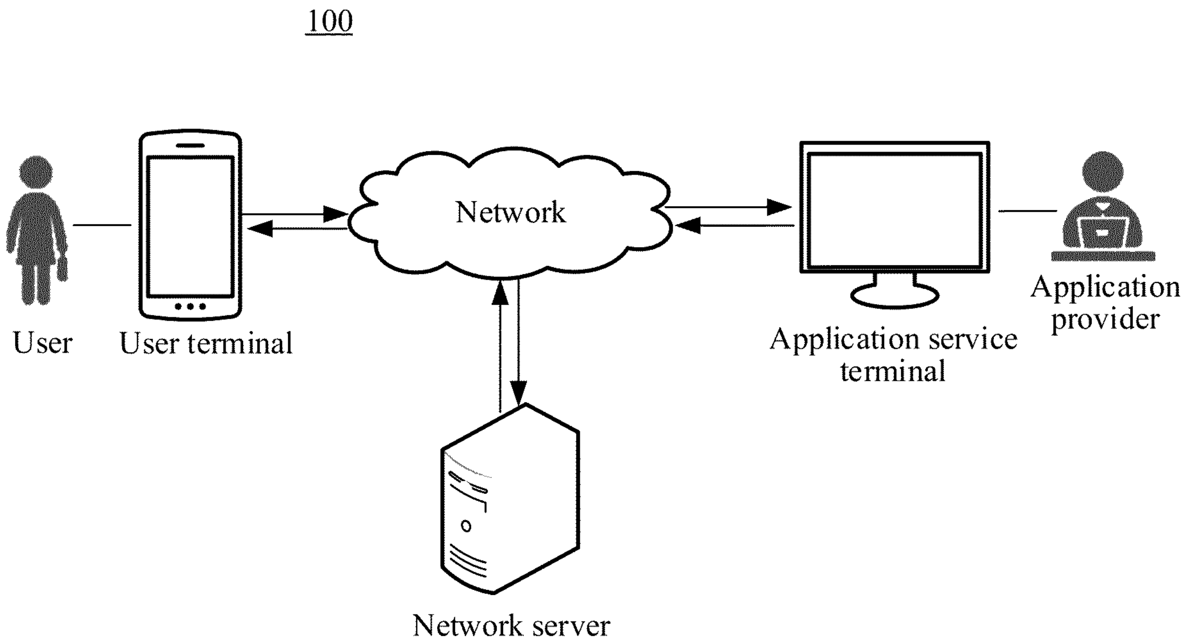
FIG. 1 illustrates an exemplary schematic diagram of a scenario of information processing according to an embodiment of the present disclosure.

In order to make the objectives, technical solutions, and advantages of the present disclosure clearer, the following will describe in detail the exemplary embodiments of the present disclosure with reference to the accompanying drawings. Apparently, the described embodiments are merely some but not all of the embodiments of the present disclosure. It is understood that the present disclosure is not limited by the exemplary embodiments described herein.

In addition, in this specification and the accompanying drawings, steps and elements that are essentially the same or similar are represented by identical or similar reference numerals, and repeated descriptions of these steps and elements will be omitted.

In addition, in this specification and the accompanying drawings, according to the embodiments, elements are described in a singular or plural form. However, the appropriate selection of the singular and plural forms for proposed situations is only for the convenience of explanation and is not intended to limit the present disclosure. Therefore, the singular form can include the plural form, and the plural form can also include the singular form, unless the context explicitly states otherwise.

In this specification and the accompanying drawings, steps and elements that are essentially the same or similar are represented by identical or similar reference numerals, and repeated descriptions of these steps and elements will be omitted. In addition, in the descriptions of the present disclosure, the terms "first", "second", and the like are only for the purpose of distinguishing the description, and may not be understood as indicating or implying the relative importance or a sequence.

For the convenience of describing the present disclosure, the following introduces concepts related to the present disclosure.

A method of the present disclosure may be based on artificial intelligence (AI). AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. For example, the method based on the AI can obtain a purpose of a user in a way similar to that of recognizing commands of a user with the naked eyes, such as expression analysis, gesture recognition, and action recognition, and match a service that the user desires.

Human-computer interaction techniques refer to technologies of implementing human-computer dialogs in an effective manner by means of computer inputting and outputting devices. The human-computer interaction techniques include the following: A machine provides a large amount of related information, prompts, requests, and the like for people by means of an outputting device or a display device; people types in related information and operation instructions, answers, prompts, requests, and the like on a machine by means of an inputting device. The human-computer interaction technique is one of important contents of computer user interface designs. The transformation and upgrading of traditional industries towards intelligence, digitization, and informatization is the main driving force for the growth of the human-computer interface market. The human-computer interface is the main force of information interaction due to its outstanding advantages of rich information display form, convenience in system control, promotion of human-computer communication, and the like. Effective utilization of human-computer interaction can not only improve the production efficiency and quality, but also enhance the user experience.

At present, information displayed by all applications on electronic devices is independent, and there are no interaction interfaces between all the applications. Users can only manually perform switching between the applications and cannot quickly invoke a plurality of applications to achieve interaction operations between the applications. For example, prices of the same product often vary on different online shopping platforms. If a user wants to buy a desired product at the most favorable price, the user often needs to repeatedly perform query and switching between a plurality of online shopping platform applications and record the prices of the product for manual comparison, which spends a lot of time and effort, and the user experience is poor.

Therefore, there is a need for an information processing method that can quickly obtain and process diversified information of the respective applications, so as to reduce manual operations of the user, meet a diversified information processing need of the user, and improve the user experience.

In the present disclosure, instructions of a user can be obtained through various human-computer interaction methods to process information. Meanwhile, the information processing method applied to a user terminal provided in the present disclosure can enable the user to quickly invoke a plurality of applications to complete information matching between the respective applications without frequent switching between the applications, which provides a new idea for human-computer interaction for the user terminal.

In summary, solutions provided in the embodiments of the present disclosure involve computer technologies such as artificial intelligence and human-computer interaction. The embodiments of the present disclosure will be further described below in conjunction with the accompanying drawings.

FIG. 1 illustrates an exemplary schematic diagram of a scenario of information processing according to an embodiment of the present disclosure.

As shown in FIG. 1, an application provider uploads the application to a network after development of an application is completed. A user can obtain the application by means of browsing a webpage, by means of information pushing, or the like. After installing the application, the user can transfer data, information, and services to the application provider through a network by means of invoking a network connection interface of a user terminal. In this example, information interaction between the application provider and the user is achieved by their own network access terminals via network communication. A server can provide services and/or supports for network communication.

In some embodiments, the user terminal may specifically be a smart phone, a tablet, a portable computer, a smart TV, a wearable device (for example, a smart bracelet and a smart watch), and the like, which have a display function. The user terminal may also be a client with a browser or various applications (including a system application and a third-party application). The user terminal may obtain information through an application, a mini program, a webpage, and the like, and display the information on a display screen of the user terminal.

In some embodiments, the network may be an Internet of Things based on the Internet and/or telecommunication network. It can be a wired network or a wireless network, for example, an electronic network that can achieve an information exchange function, such as a local area network (LAN), a metropolitan area network (MAN), a wide area network (WAN), and a cellular data communication network.

In some embodiments, the server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms.

Figure 2:
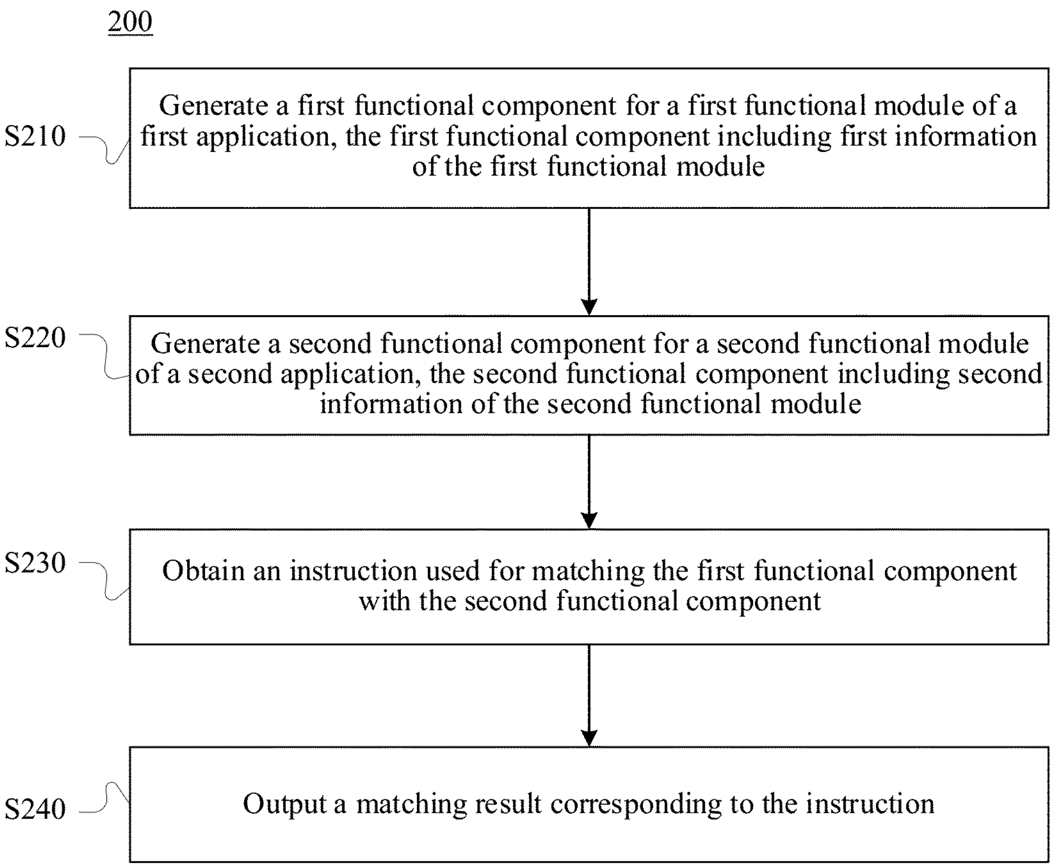
FIG. 2 illustrates a flowchart of an information processing method according to an embodiment of the present disclosure.

FIG. 2 illustrates a flowchart of an information processing method 200 according to an embodiment of the present disclosure.

Step S210: Generate a first functional component for a first functional module of a first application to cause the first functional component to include first information of the first functional module.

Step S220: Generate a second functional component for a second functional module of a second application to cause the second functional component to include second information of the second functional module.

Functional components are generated to facilitate a user to quickly obtain information in the modules. A functional module is a component related to a function in an application, such as a user interface (UI) component or a UI in the application. In the embodiments of the present disclosure, the functional component may also be referred to as a UI component that exist independently in an UI, and may be a desktop widget that can reflect interface information of the application. However, the functional component is not limited to being arranged on a homepage or desktop of the user terminal, but it may be arranged on display interfaces of various user terminals. In some application scenarios, due to the fact that the first functional module and the second functional module belong to different pages (for example, pages of different applications or different pages of the same application), the first functional module and the second functional module cannot interact directly. The first functional component can be detached from a page of the first application and exist independently in the user interface. For example, the first functional component can be displayed as a desktop widget. Similarly, the second functional component can be detached from a page of the second application and exist independently in the user interface.

It should be understood that in one embodiment, the first application and the second application are the same application, and the first functional component and the second functional component may be different functional components of the same application. In another embodiment, the first functional component and the second functional component may also be functional components of different applications. The first functional component and the second functional component may have same or similar information, or the first functional component and the second functional component may have interfaces for information interaction.

Step S230: Obtain an instruction used for matching the first functional component with the second functional component.

In one embodiment, the instruction used for matching the first functional component with the second functional component can be obtained through various information inputting devices such as a mouse, a keyboard, a touch screen, a voice control device, and an action recognition device that can convert user the instruction of the user into a signal that can be recognized by the user terminal. The instruction can be achieved by performing a specific operation on the mouse, the keyboard, the touch screen, and the like by the user (for example, the user may click a matching selection control with the mouse to instruct the matching between the first functional component and the second functional component; the user may press a predetermined matching activation key on the keyboard to instruct the matching between the first functional component and the second functional component; the user may drag a functional component to a predetermined matching activation position on the touch screen to instruct the matching between the first functional component and the second functional component; or the like). The instruction can also be achieved by recognizing and analyzing a voice, an image, a behavior, and the like of the user (for example, the instruction for the matching between the first functional component and the second functional component can be achieved by means of a voice input of the user; the instruction for the matching between the first functional component and the second functional component can be achieved by acquiring and analyzing the image of the user (for example, face recognition); the instruction for the matching between the first functional component and the second functional component can be achieved by acquiring and analyzing the action of the use (for example, gesture recognition)).

In one embodiment, step S230 may include: displaying a matching confirmation control in response to a dragging operation for at least partially overlapping a region corresponding to the first functional component in a user interface to a region corresponding to the second functional component in the user interface; and generating the instruction in response to an operation that is performed on the matching confirmation control and indicates a confirmation of the matching. For example, a user desktop includes first functional component A and second functional component B. When first functional component A is dragged to a position at least partially overlapping the second functional component B, a matching confirmation control is displayed. The instruction is generated in response to an operation (for example, the operation that indicates a confirmation of the matching) performed on the matching confirmation control.

Step S240: Output a matching result corresponding to the instruction.

In summary, according to the information processing method of the embodiments of the present disclosure, an interaction method (namely, generating the first functional component and the second functional component, and obtaining the instruction for matching the two functional components) for functional modules of different user interfaces (for example, different pages of the same application or pages of different applications) is provided. It can avoid the trouble that a user needs to perform switching between different pages and manually compare information (for example, manually comparing items in shopping carts of different shopping applications), so that information matching can be performed on the functional modules of different user interfaces without the need of interface switching between the respective user interfaces, and the convenience of user interactions is improved.

It should be understood that there may be diversified ways to output the matching result corresponding to the instruction. For example, matching information can be displayed on the display screen; the matching result can be conveyed through voice broadcasting; and the user can be informed of the matching state or degree by means of a signal indicator lamp. The matching result of the first functional component and the second functional component can be achieved in various ways that enable the user to perceive and obtain information, such as sound, light, heat, and electricity.

The first functional component and the second functional component can be matched by extracting the same or similar information, searching for same or similar information, and the like. The first functional component and the second functional component can be matched based on analysis of one or more pieces of multimedia information, such as text descriptions, picture information, audios, or videos, related to the functional components. The analysis process can be based on a predetermined similarity function related to information for matching.

In some embodiments, a container configured to perform information matching on the first functional component and the second functional component can be generated in response to the instruction used for matching the first functional component with the second functional component, and the matching result is outputted in the container, namely, an information-matching-result is outputted.

In some embodiments, the process of matching the first functional component with the second functional component can also include a matching confirmation process. The user can confirm to match the first functional component with the second functional component through the matching confirmation control.

In some embodiments, the result of matching the first functional component with the second functional component can be outputted in a way of correspondingly displaying content information of the matching in both the first functional component and the second functional component, or in a way of displaying content information of the matching in an information-matching-result display component.

In some embodiments, the information processing method 200 may include: performing information matching on the first information of the first functional module of the first application corresponding to the first functional component and the second information of the second functional module of the second application corresponding to the second functional component.

For example, when the information of the first functional module and the information of the second functional module contain associated information for comparison, in response to an instruction used for comparing the first functional component with the second functional component, the first information of the first functional module of the first application corresponding to the first functional component is compared with the second information of the second functional module of the second application corresponding to the second functional component to obtain a matching result.

In the embodiments of the present disclosure, in an application scenario that the first functional module is a first shopping cart of a first shopping application and the second functional module is a second shopping cart of a second shopping application, the first information includes at least one item (e.g., commodity item) in the first shopping cart, and the second information includes at least one item in the second shopping cart. In the embodiments of this application, the information matching can be performed on the items in the first shopping cart and the items in the second shopping cart. In one embodiment, whether the items are matched can be determined based on attributes such as name and/or pictures of items. In other words, whether the items are matched can be determined based on at least one attribute among the items. For example, when the names of two items are the same or similar, it is determined that the two items are matched. For example, when the names of two items are the same and the pictures of the two items are similar (for example, a picture similarity reaches a threshold that is, for example, 90%), it is determined that the two items are matched. In one embodiment, after the information matching is completed, matched items can be displayed correspondingly (e.g., one-to-one) in the first functional component and the second functional component, and a preferred item among the matched items between the first functional component and the second functional component can be highlighted. The preferred item is determined based on prices and/or reviews of the matched items. In some embodiments, this application may further include: displaying a selection-deletion control when the matched items exist in the first functional component and the second functional component, the selection-deletion control being used for deleting a non-preferred item from the matched items in the shopping cart of the first shopping application or the shopping cart of the second shopping application. In addition, this application may further include: displaying a payment selection control when the matched items exist in the first functional component and the second functional component, the payment selection control being used for paying the preferred item among the matched items in the first shopping cart or the second shopping cart.

Moreover, the information processing method 200 can not only match information (for example, the first information and the second information) that can be directly obtained from the functional modules, but also match content information that cannot be directly obtained from the functional modules but can be indicated by the functional modules. For example, when the content information indicated by the functional modules is audios, the functional modules may possibly only reflect the names of the audios. The method of the present disclosure can still be used to match specific audio contents indicated by the functional modules.

According to the embodiments of the present disclosure, the content information indicated by the first functional module of the first application can also be obtained from the first functional component; the content information indicated by the first functional module of the first application is retrieved through the second functional component; and a retrieval result of the retrieval is outputted and is taken as the matching result between the first functional component and the second functional component. In the application scenario of retrieving the matched information, the second functional component may be a browser functional component (for example, a web browser and an app with an information browsing function), and the content information indicated by the first functional module of the first application may be at least one of a text, an image, an audio, and multimedia information.

The information matching process in the information processing method of the present disclosure can be implemented on both the user terminal and the network server. That is, in response to the instruction for matching the first functional component with the second functional component, the user terminal can perform the matching operation on the first information and the second information to obtain the matching result. Or, in response to the instruction for matching the first functional component with the second functional component, the user terminal can transmit the first information and the second information to the network server, so as to match the first information with the second information to obtain the matching result. The user terminal outputs the matching result.

In addition, the information (the first information and the second information) for the matching processing can be either information directly displayed by the functional components or information in databases corresponding to the functional components. That is, the information matching can be performed, in response to the instruction used for matching the first functional component with the second functional component, on the first information displayed by the first functional component and the second information displayed by the second functional component, and the matching result between the first information displayed by the first functional component and the second information displayed by the second functional component can be outputted. Or, the information matching can be performed, in response to the instruction used for matching the first functional component with the second functional component, on the first information in a database corresponding to the first functional component and the second information in a database corresponding to the second functional component, and the matching result between the first information in the database corresponding to the first functional component and the second information in the database corresponding to the second functional component can be outputted. It is understood that the databases corresponding to the functional components can be either related database files stored in the user terminal or related database files stored in the network server.

Figure 3:
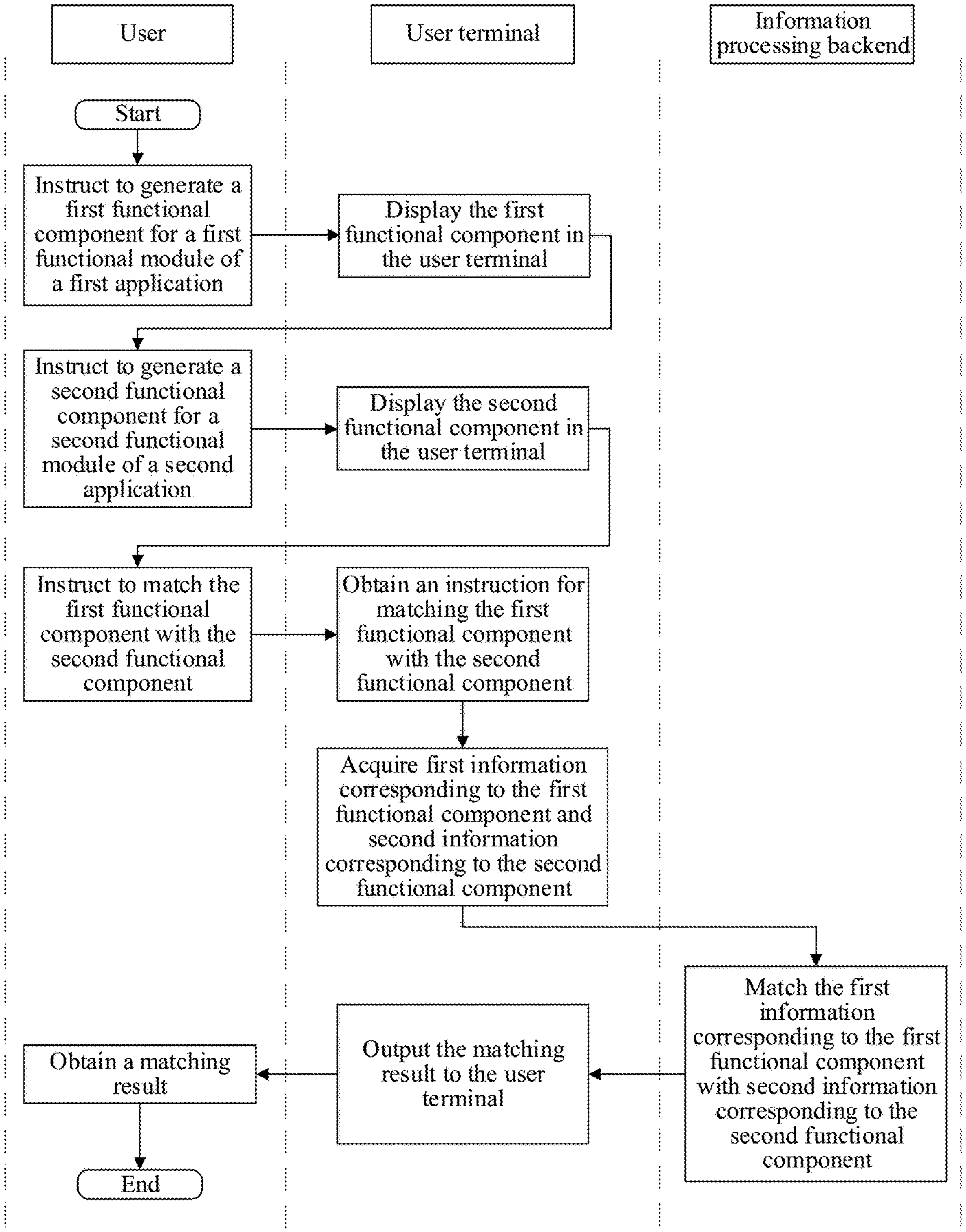
FIG. 3 illustrates an exemplary schematic diagram of an information processing process according to an embodiment of the present disclosure.

FIG. 3 illustrates an exemplary schematic diagram of an information processing process according to an embodiment of the present disclosure.

As shown in FIG. 3, the user terminal first obtains an instruction for generating a first functional component for a first functional module. In response to the instruction, the user terminal creates the first functional component and displays the first functional component on a display screen of the user terminal. In the same way, the user terminal obtains an instruction for generating a second functional component for a second functional module. In response to the instruction, the user terminal creates the second functional component and displays the second functional component on the display screen of the user terminal. At this point, the user terminal can display the first functional component and the second functional component simultaneously, cause the first functional component to include first information of the first functional module of a first application, and cause the second functional component to include second information of the second functional module of a second application.

Next, in response to a user input, the user terminal obtains an instruction used for matching the first functional component with the second functional component.

In response to the instruction, the user terminal acquires the first information corresponding to the first functional component and the second information corresponding to the second functional component and provides the first information and the second information for an information processing backend. Then, the information processing backend matches the first information corresponding to the first functional component with the second information corresponding to the second functional component to obtain a matching result. In some embodiments, the information processing backend used herein may be either an information processing backend of the user terminal or a network server configured to process information.

After the matching processing is completed, the information processing backend provides the matching result for the user terminal, and the user terminal outputs the matching result of the matching between the first functional component and the second functional component to a user.

FIG. 4A to FIG. 4I show schematic diagrams of a display interface of a user terminal that achieves item (e.g., commodity item) information matching through an information processing method according to an embodiment of the present disclosure.

Figure 4A:
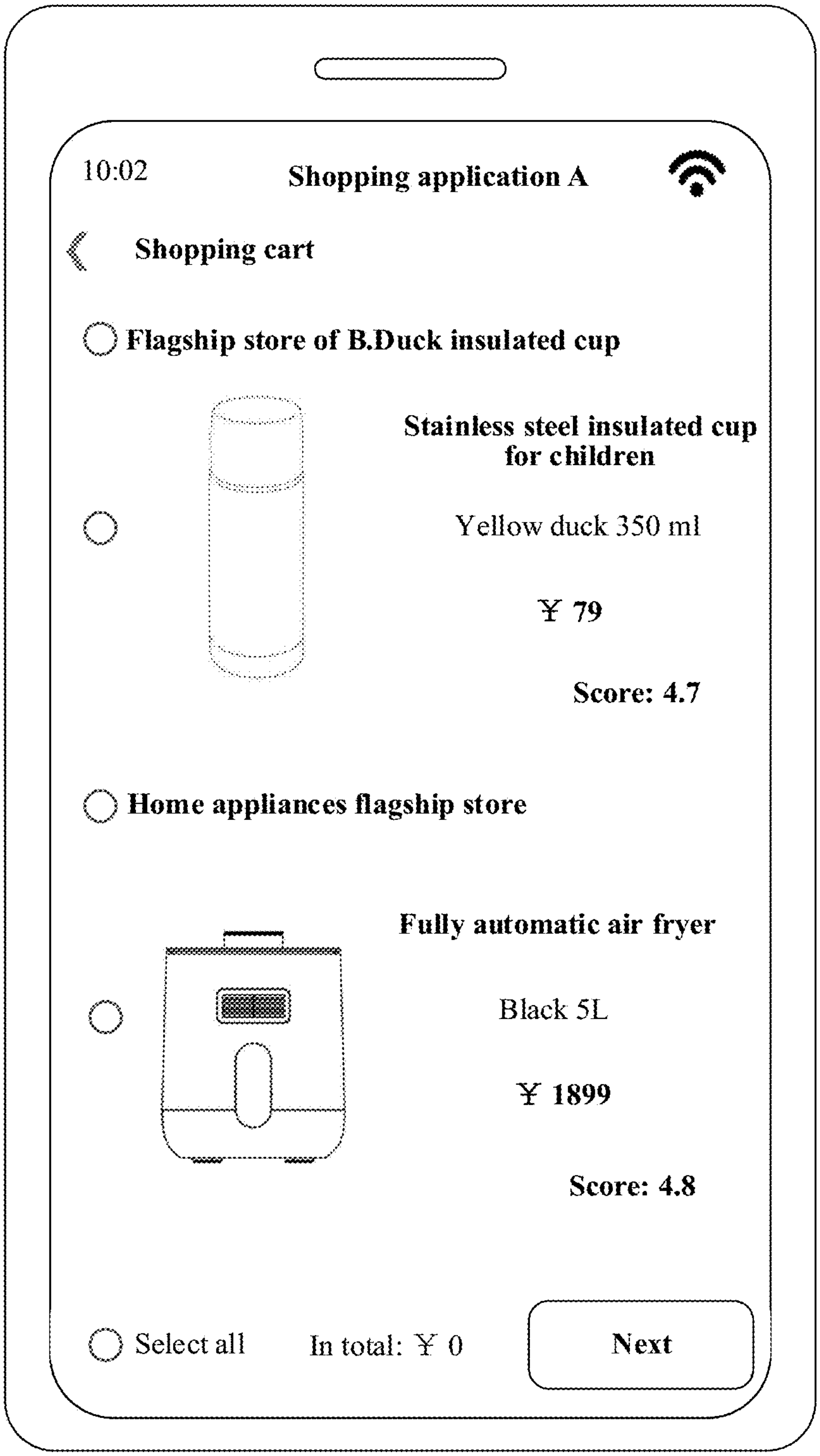
FIG. 4A to FIG. 4K illustrate schematic diagrams of a display interface of a user terminal that achieves item information matching through an information processing method according to an embodiment of the present disclosure.
Figure 4B:
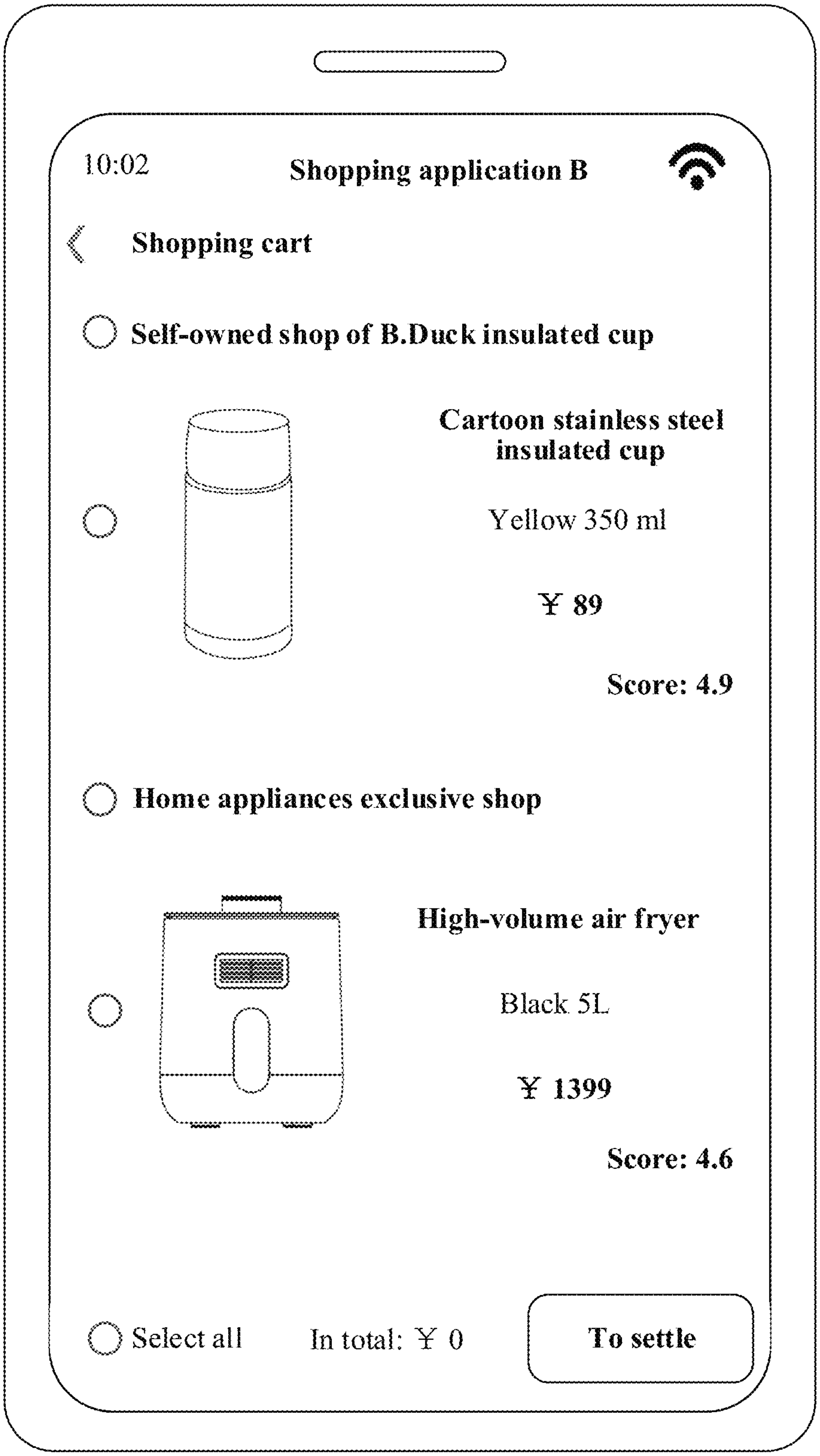
Figure 4C:
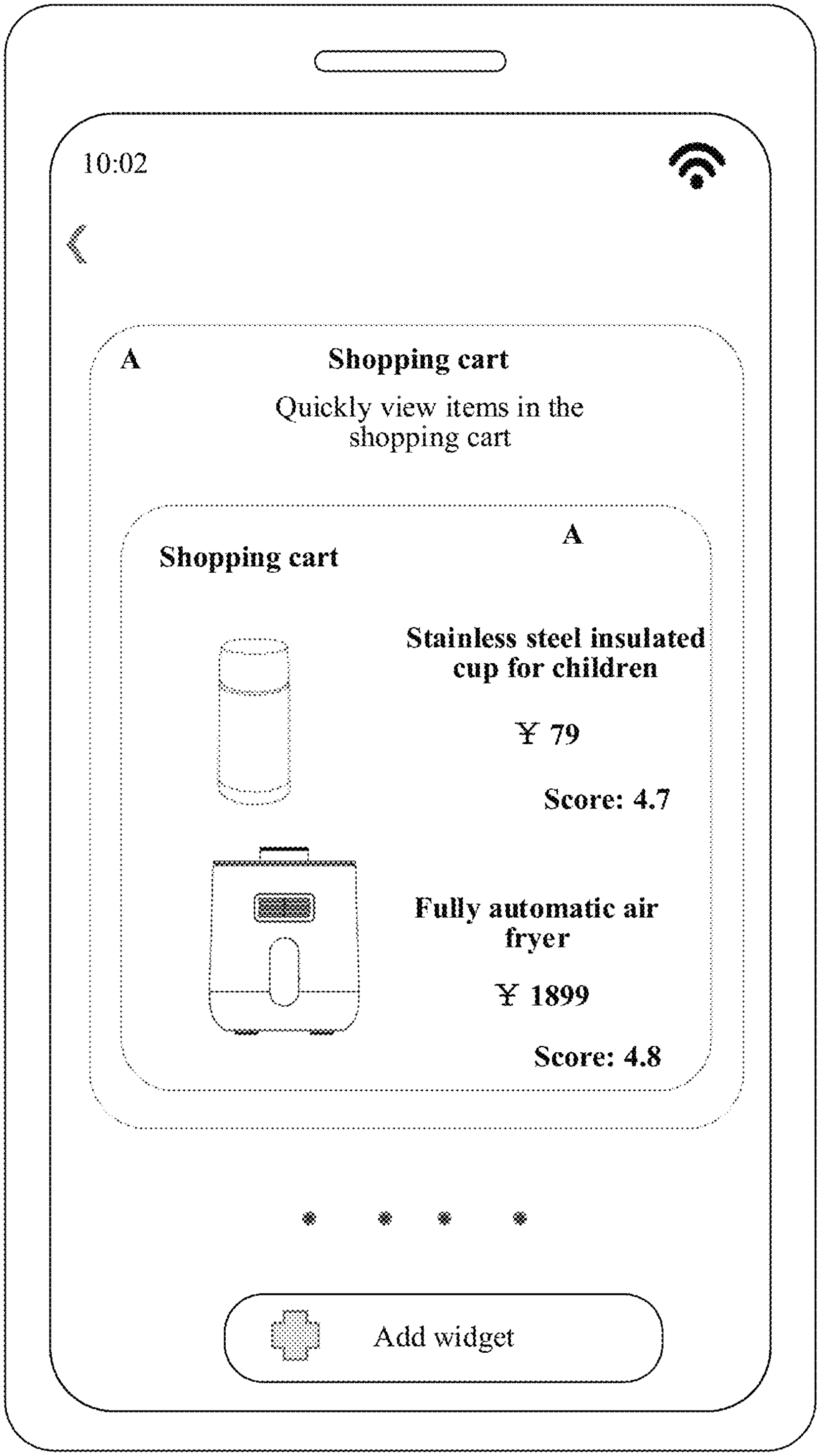
Figure 4D:
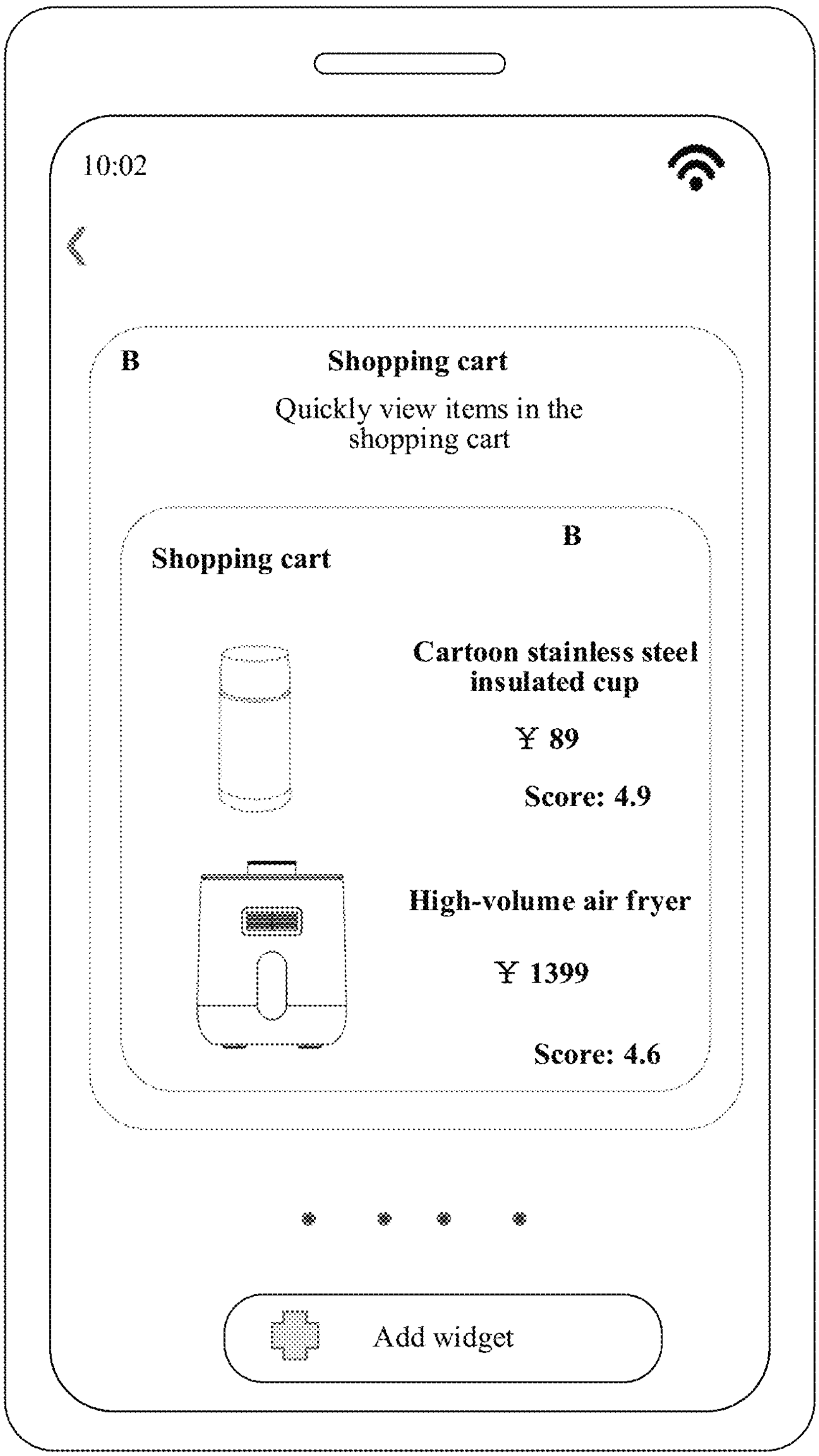

FIG. 4A and FIG. 4B show schematic diagrams of a shopping cart interface of a shopping application according to an embodiment of the present disclosure. It can be seen from FIG. 4A that a user adds items/commodities such as insulated cup and air fryer to a shopping cart of shopping application A. The user can obtain item information of the insulated cup and the air fryer from the shopping cart of shopping application A. The item information include one or more of a name, a price, a score, a parameter, and the like of the items. Similarly, it can be seen from FIG. 4B that the user adds items such as insulated cup and air fryer to a shopping cart of shopping application B. The user can obtain item information of the insulated cup and the air fryer from the shopping cart of shopping application B. The item information include one or more of a name, a price, a score, a parameter, and the like of the items. In shopping application A and shopping application B, same or similar items or commodities may have different prices, scores, parameters, and other information.

In order to conveniently compare information of the same or similar items/commodities in shopping application A and shopping application B, desktop functional components can be generated respectively for the shopping cart of shopping application A and the shopping cart of shopping application B. This process can be achieved through a human-computer interaction interface similar to those shown in FIG. 4C and FIG. 4D in a desktop functional-component adding module. For example, when the user clicks button "Add widget" button in the figure, the user terminal sets a shopping cart related functional module of the shopping application as a desktop functional component. In the process of setting the shopping cart related functional module of the shopping application as the desktop functional component, a simplified thumbnail of the shopping cart of the shopping application can be displayed.

Figure 4E:
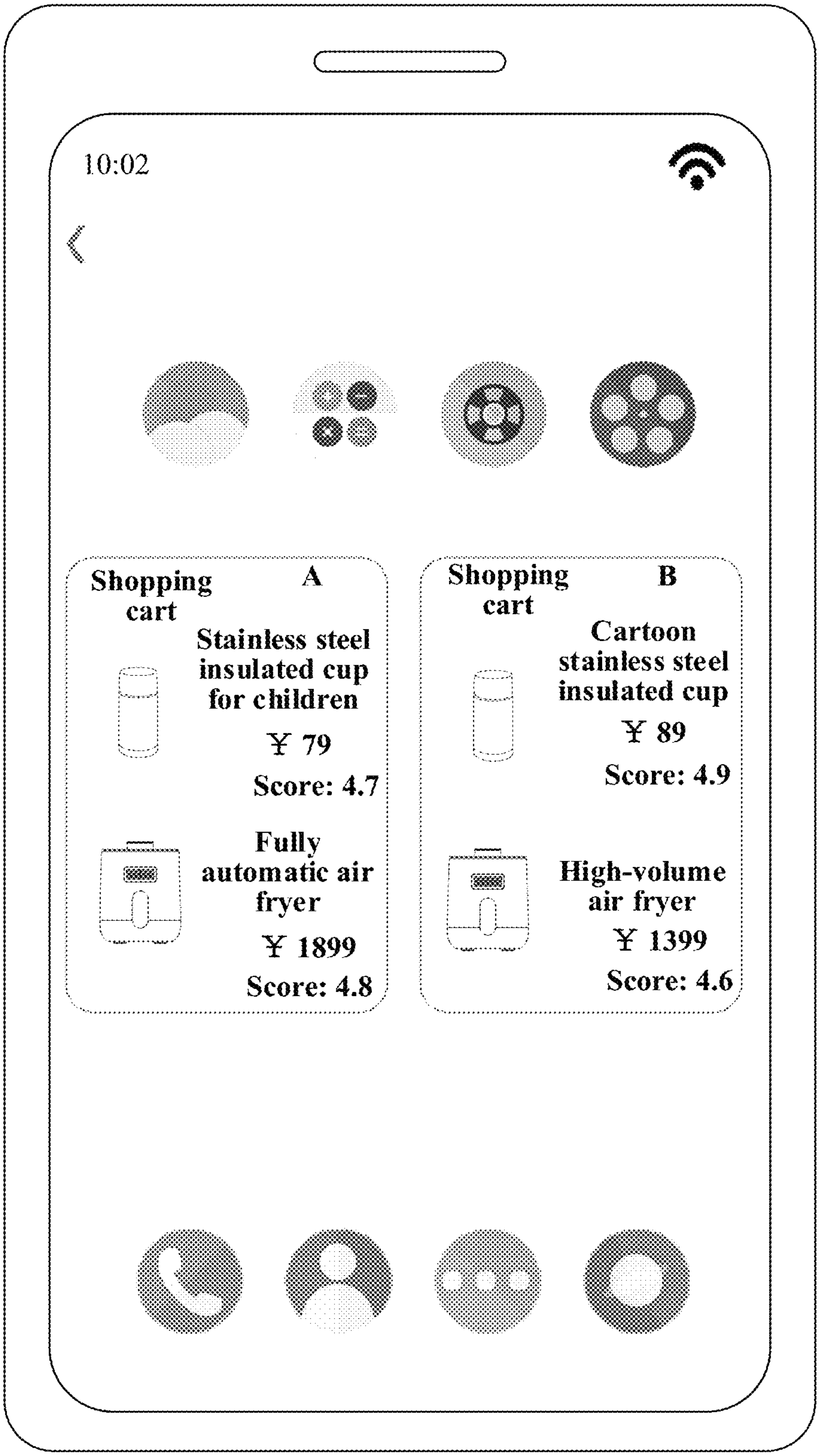

After the desktop functional components are respectively generated for the shopping cart of shopping application A and the shopping cart of shopping application B, the shopping cart functional component of shopping application A and the shopping cart functional component of shopping application B can be displayed on an operating desktop (namely, the user interface) of the user terminal (as shown in FIG. 4E). The user can view items in both the shopping cart of shopping application A and the shopping cart of shopping application B through the shopping cart functional component of shopping application A and the shopping cart functional component of shopping application B. On this interface, the shopping cart functional component of shopping application A and the shopping cart functional component of shopping application B can make corresponding display changes and/or trigger related functional operations according to a transformation command of the user for the functional components, such as zooming in, zooming out, and translation.

Figure 4F:
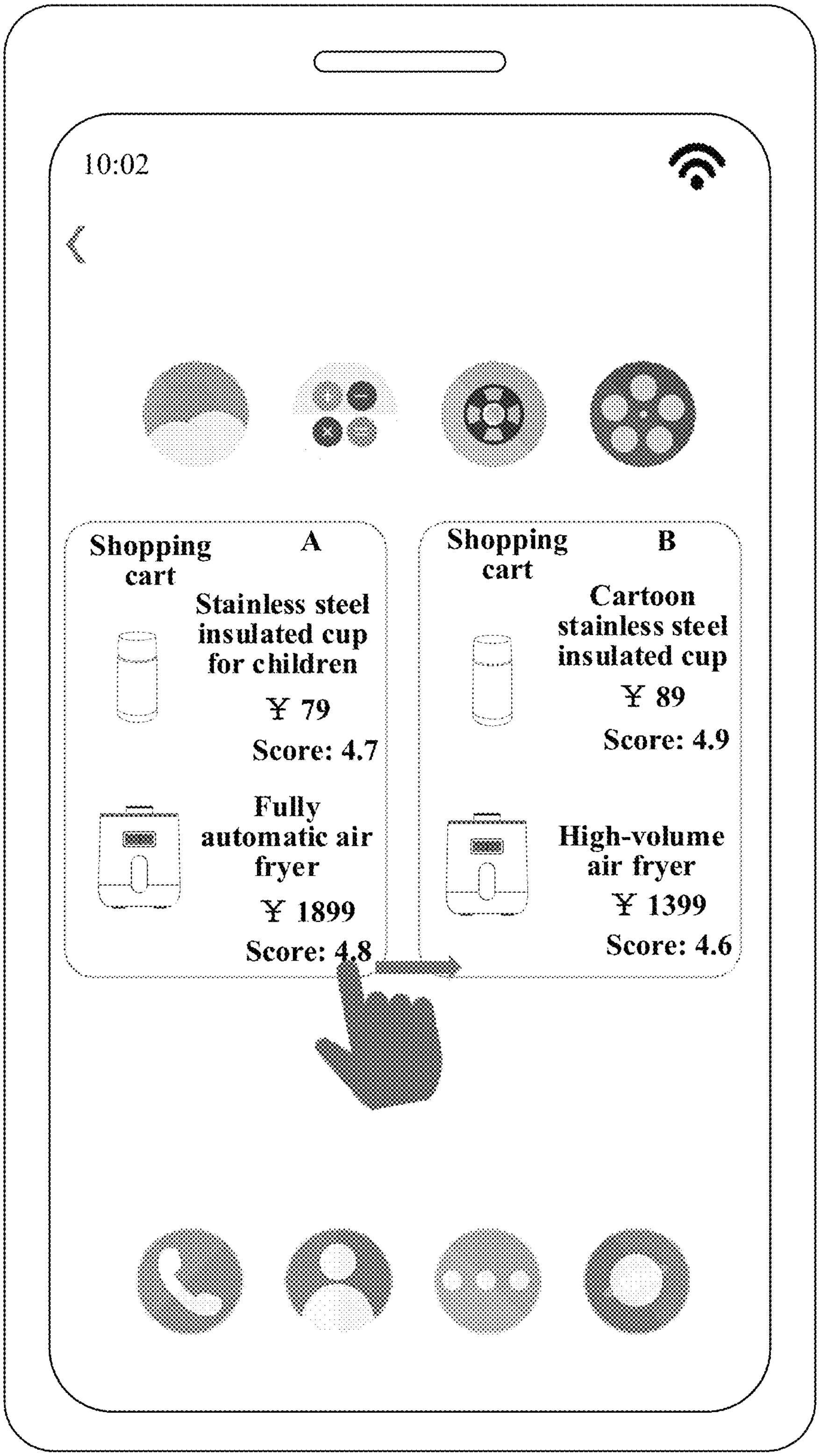

According to the embodiments of the present disclosure, the user can translate the shopping cart functional component of shopping application A and the shopping cart functional component of shopping application B to overlap (namely, at least partially overlap), so as to achieve an instruction for performing matching of same or similar items among items in the shopping cart of shopping application A and among items in the shopping cart of shopping application B to further obtain a preferred item among the matched items (as shown in FIG. 4F).

Figure 4G:
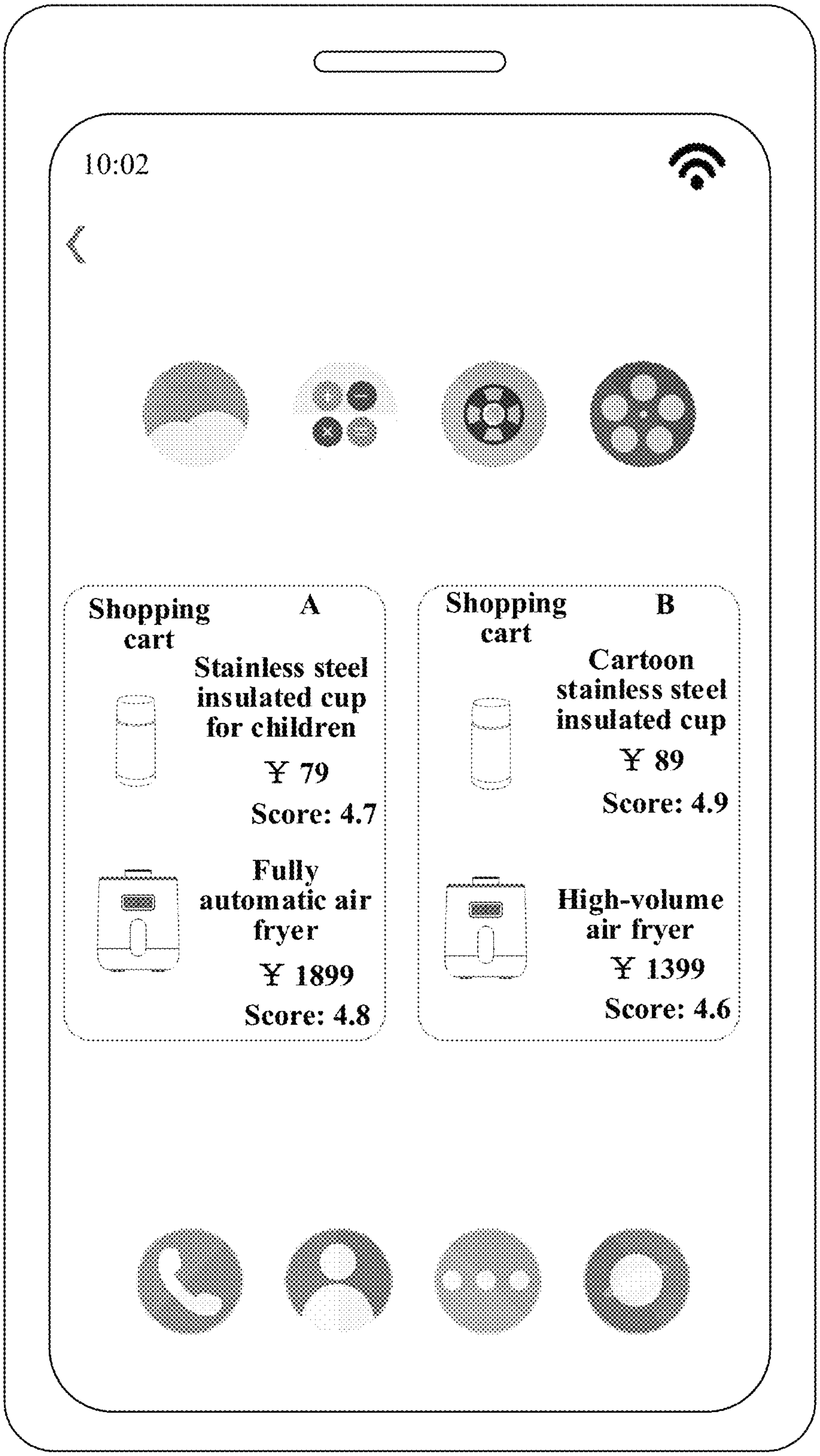

In some embodiments, in response to the instruction for matching the same or similar items, a container configured to match the items in the shopping cart of shopping application A with the items in the shopping cart of shopping application B (as shown in FIG. 4G).

In the matching process, the same or similar items can be confirmed through similarity analysis of one or more pieces of information (also referred as attributes) in text descriptions, pictures, and displayed videos of items/commodities. The analysis process can be implemented in both a user terminal and a network server.

After the matching operation is completed, an item matching result can be outputted in the shopping cart functional component of shopping application A and the shopping cart functional component of shopping application B. Or, an item matching result can be outputted in the container configured to match the items in the shopping cart of shopping application A with the items in the shopping cart of shopping application B. In some embodiments, the item matching result can also be outputted in an item-matching-result display component.

In order to display the comparison result of the matched items more clearly, a preferred item among the same or similar items can be highlighted, or the same or similar items in the shopping cart of shopping application A and the shopping cart of shopping application B can be displayed correspondingly, so that the user can more conveniently and quickly obtain preferred item information and make a choice. The corresponding displaying of the matched items (such as items 1 and 2) is, for example, displaying item 1, belonging to shopping application A, of the matched items in the first functional component and displaying item 2, belonging to shopping application A, of the matched items in the second functional component. Furthermore, the display position of item 1 corresponds to display position of item 2.

Figure 4H:
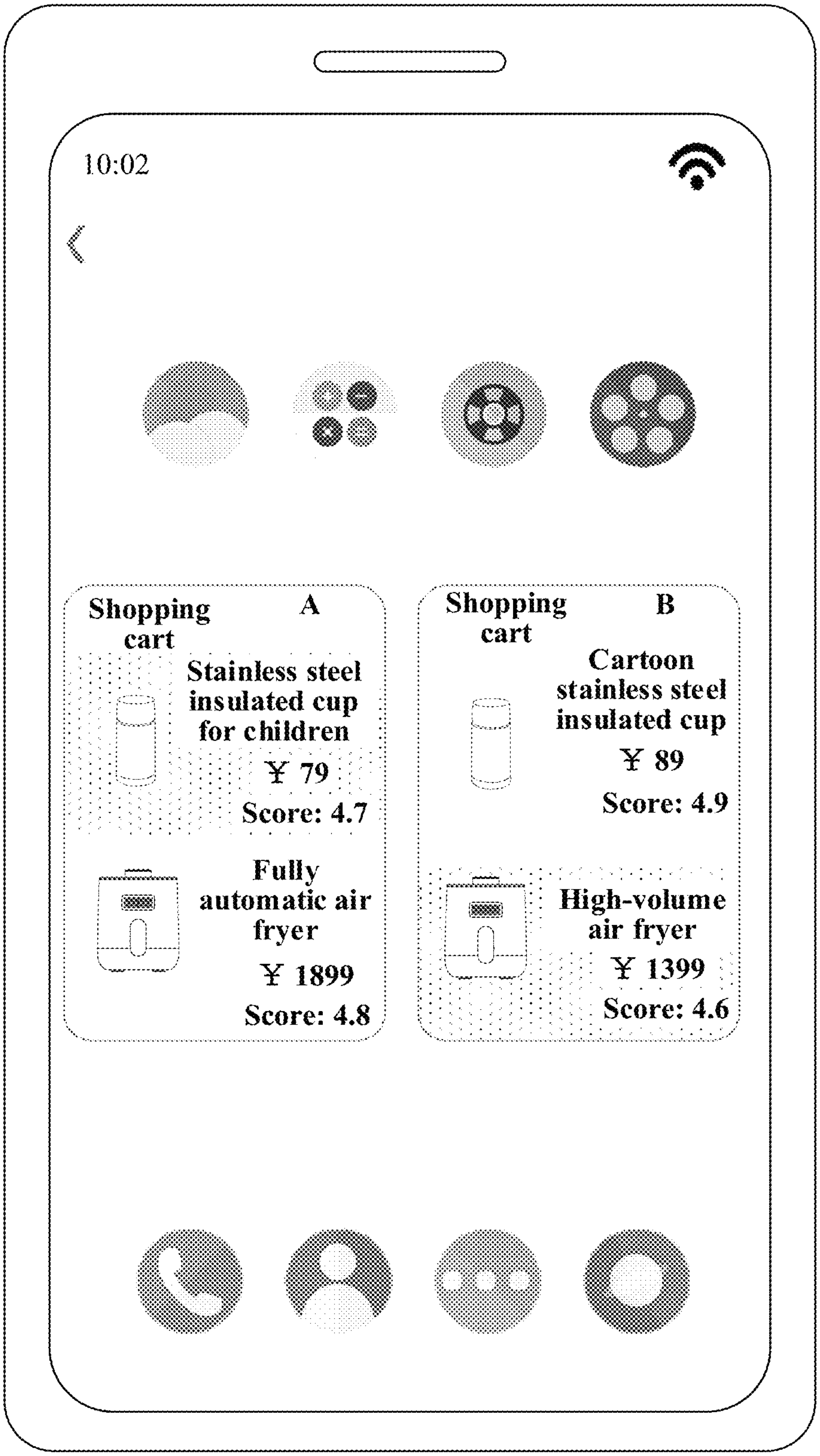
Figure 4I:
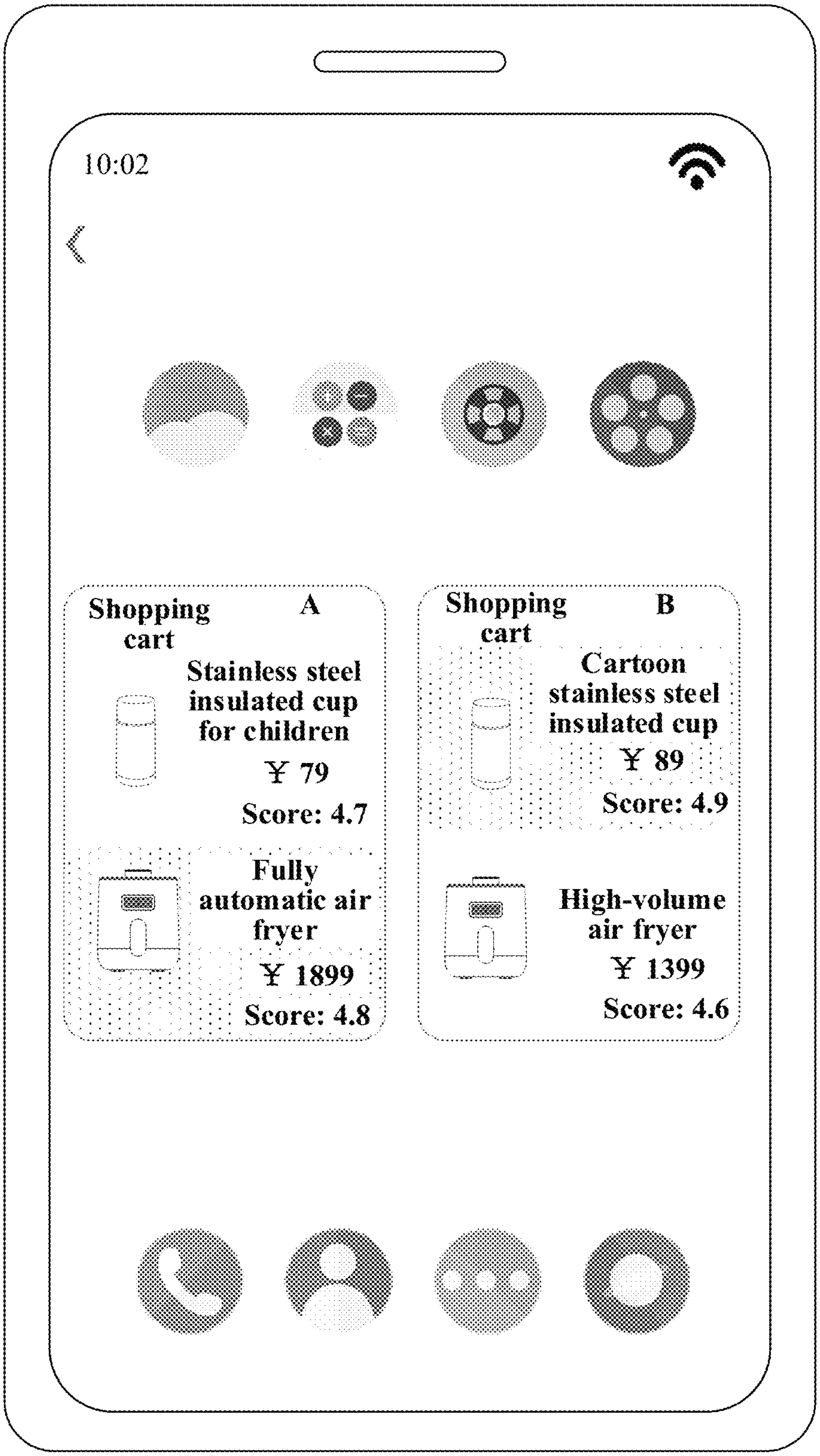

The preferred item (e.g., commodity item) can be determined based on evaluation conditions including, for example, the price of the item, the score of the item, parameters of the item, or a combination thereof. For example, when determining a preferred item based on the price of the item, an item with a lower price among the same or similar items can be selected as the preferred item, and the preferred item is then highlighted (as shown in FIG. 4H), so as to help the user to quickly obtain information of an affordable item. When determining a preferred item based on the score (e.g., review score) of the item, a preferred item with a higher score among the same or similar items can be selected as a preferred item, and the preferred item is highlighted (as shown in FIG. 4I), so as to help the user to quickly obtain information of a highly reviewed and/or more trustworthy item. Similarly, when determining a preferred item based on the price and score, an evaluation function for item selection can be formed based on the price and score of the items, and a preferred item can be determined based on a calculation result of the evaluation function of the items; and the preferred item is provided to the user to help the user to quickly obtain information of cost-effective item with high quality and less cost.

Figure 4J:
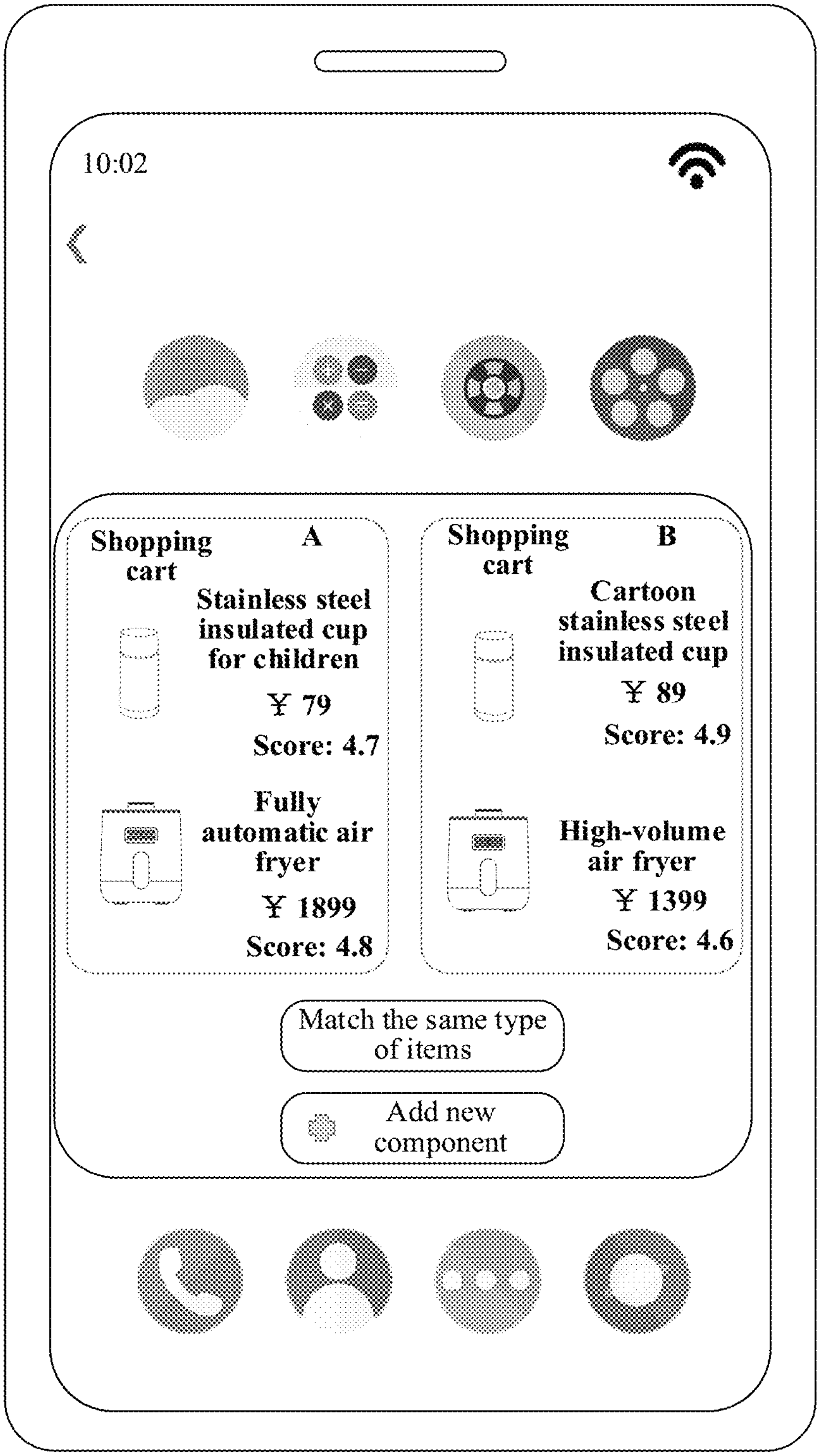

In some embodiments, a control for confirming comparison of the same type of items can also be displayed on a desktop of the user terminal (as shown in FIG. 4J). The user can achieve, by clicking button "Match the same type of items" an instruction for performing matching of same or similar items on the items in the shopping cart of shopping application A and the items in the shopping cart in shopping application B. In some embodiments, the matching here is matching of the same or similar items, which can be performed using a default item comparison method (for example, according to a judging criteria for the same or similar items preset by a desktop component provider), or is matching of the same or similar items, which can be performed using a item comparison method selected by the user (for example, a desktop component provides a human-computer interaction interface with the user, and the user can select a comparison condition).

In addition, the container configured to match the items in the shopping cart of shopping application A with the items in the shopping cart of shopping application B can also include a functional-component adding control (as shown in FIG. 4J). The functional-component adding control is used for adding a new functional component (for matching) of shopping applications into the container, so as to achieve item information matching of multiple shopping applications.

Figure 4K:
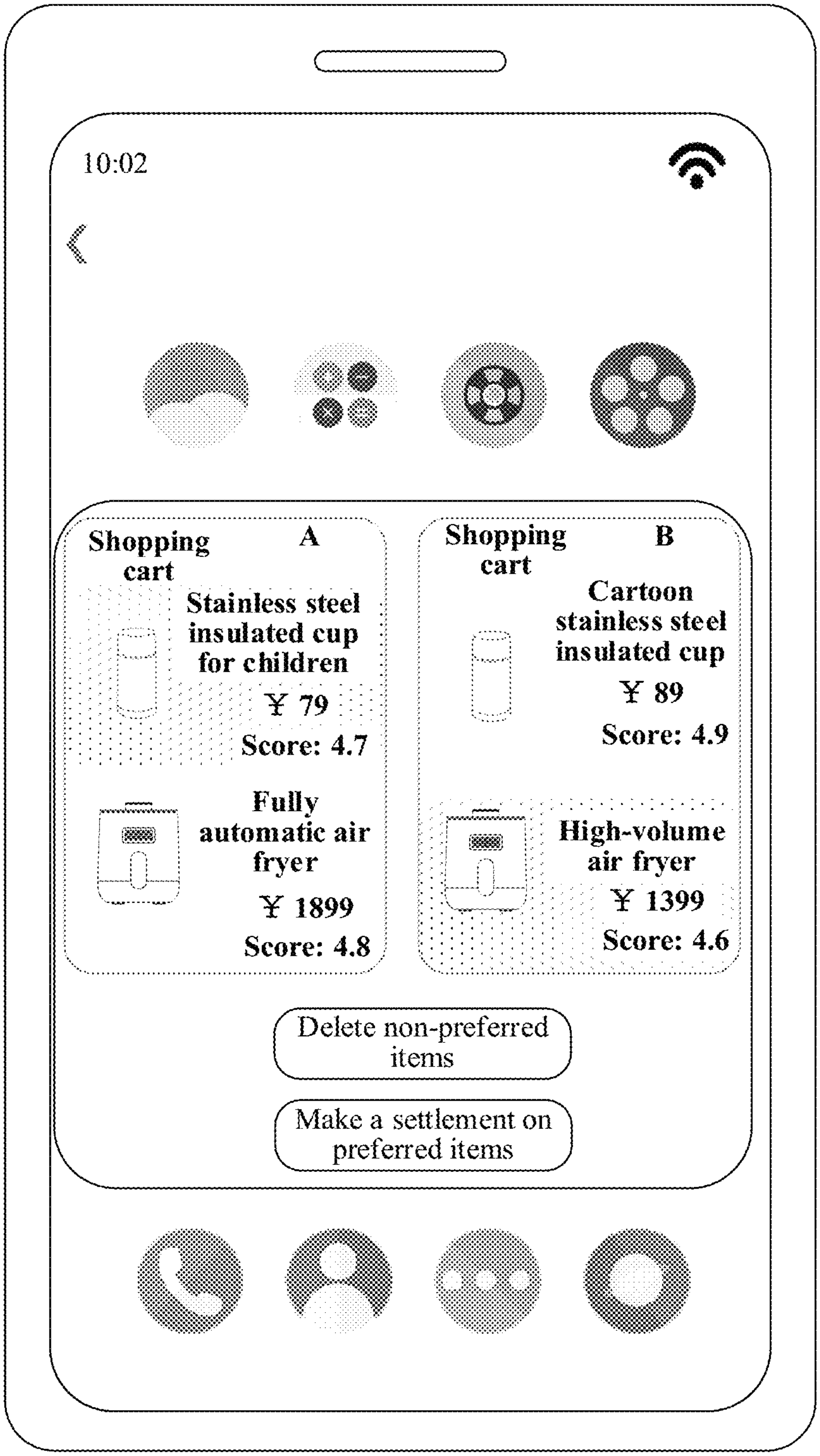

In some embodiments, a selection-deletion control can be displayed when the matched items exist in the first functional component and the second functional component (as shown in FIG. 4K). Through the selection-deletion control, the user can delete a non-preferred item (e.g., commodity item) from the same or similar items (e.g., commodities) in the shopping cart of shopping application A or shopping cart of shopping application B.

In some embodiments, a payment selection control can also be displayed when the matched items exist in the first functional component and the second functional component (as shown in FIG. 4K). Through the payment selection control, the user can directly make a settlement on the preferred item among the same or similar items in the shopping cart of shopping application A and/or the shopping cart of shopping application B, instead of opening shopping application A and/or shopping application B respectively, which reduces the number of the steps of operations of the user, thereby improving the user experience. It is understood that after the items are matched, payment and settlement can be performed on the preferred item in the shopping cart of shopping application A directly through the payment selection control separately, or payment and settlement can be performed on the preferred item in the shopping cart of shopping application B directly through the payment selection control separately, or payment and settlement can be performed on the preferred item in the shopping cart of shopping application A and the shopping cart of shopping application B directly through the payment selection control.

It can be seen from the descriptions in FIG. 4A to FIG. 4K that using the information processing method of the present disclosure to match the items can directly match all the same or similar items in the shopping cart on the desktop of the user terminal and automatically mark the preferred item. Through this method, manual operations of the user are greatly reduced; the convenience of interaction of the user and the efficiency of comparing the same type of items by the user are improved; and the convenience of operation of the user is improved.

According to the embodiments of the present disclosure, the information processing method described in the present disclosure can also perform information matching on texts, images, audios, multimedia information, and the like.

Figure 5A:
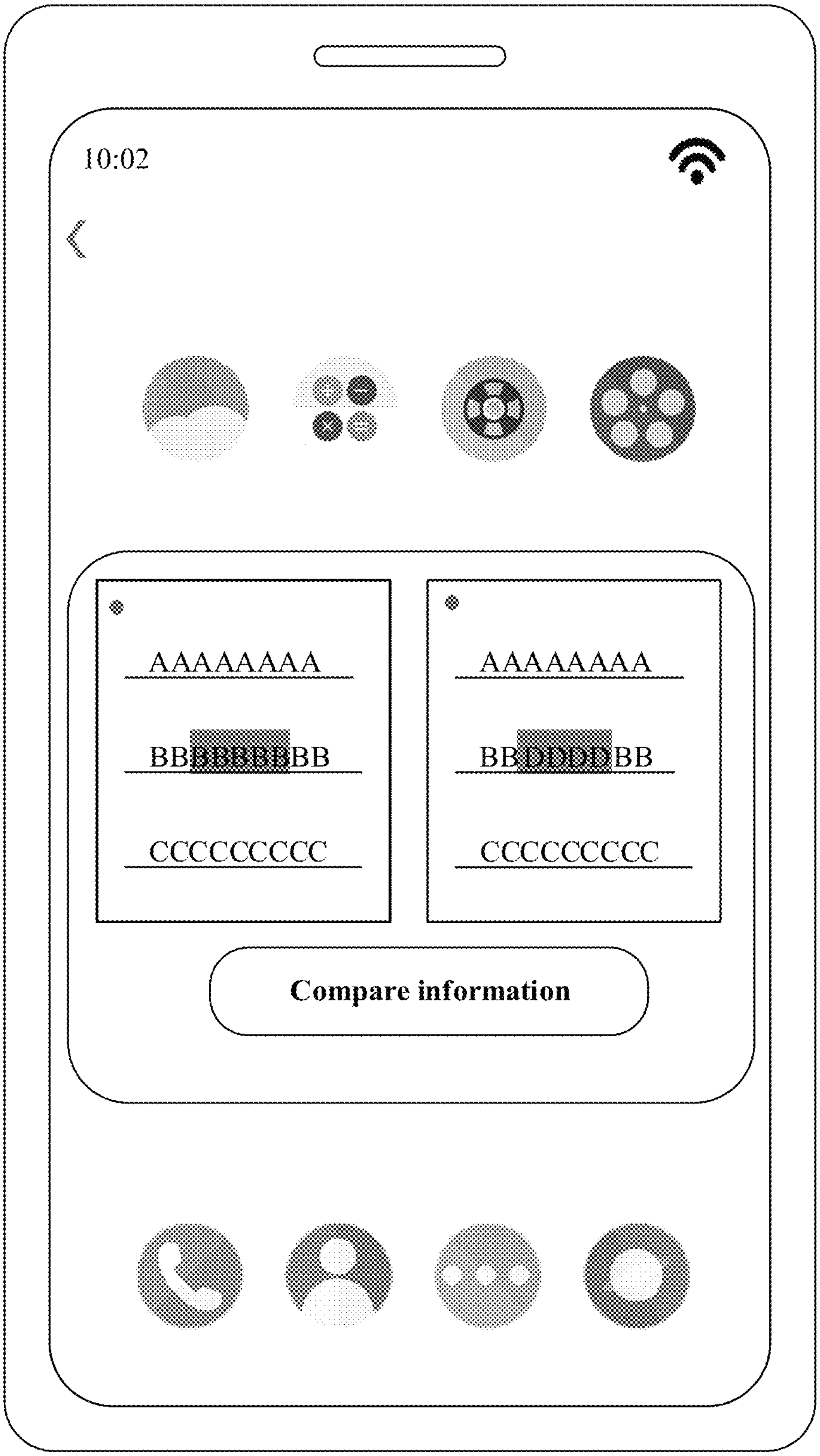
FIG. 5A to FIG. 5D illustrate schematic diagrams of a display interface of a user terminal that achieves information processing through an information processing method according to an embodiment of the present disclosure.

For example, when information for matching (e.g., information to-be-matched), such as the first information and the second information, is a text, as shown in FIG. 5A, two documents for matching can be added as desktop functional components respectively, and an instruction for information matching of a user can be obtained. In response to the instruction for information matching, document information in the functional component can be matched, and a processing result of the information in the functional component is displayed in the functional component. It is understood that the two documents here can be documents displayed through different functional components of the same application, or documents displayed through functional components of different applications. Formats of the two documents can be the same or different. The documents can be displayed through document editor software, such as word editor and txt document editor), or the documents can be displayed through various document information display software (such as a browser and a pdf readers).

In some embodiments, the information for matching can not only be information directly displayed by the functional component, but also be information indicated by the functional component, not displayed on the functional component. That is, the information processing method described in the present disclosure can further include: performing information matching on content information indicated by the first functional module of the first application corresponding to the first functional component and content information indicated by the second functional module of the second application corresponding to the second functional component.

Figure 5B:
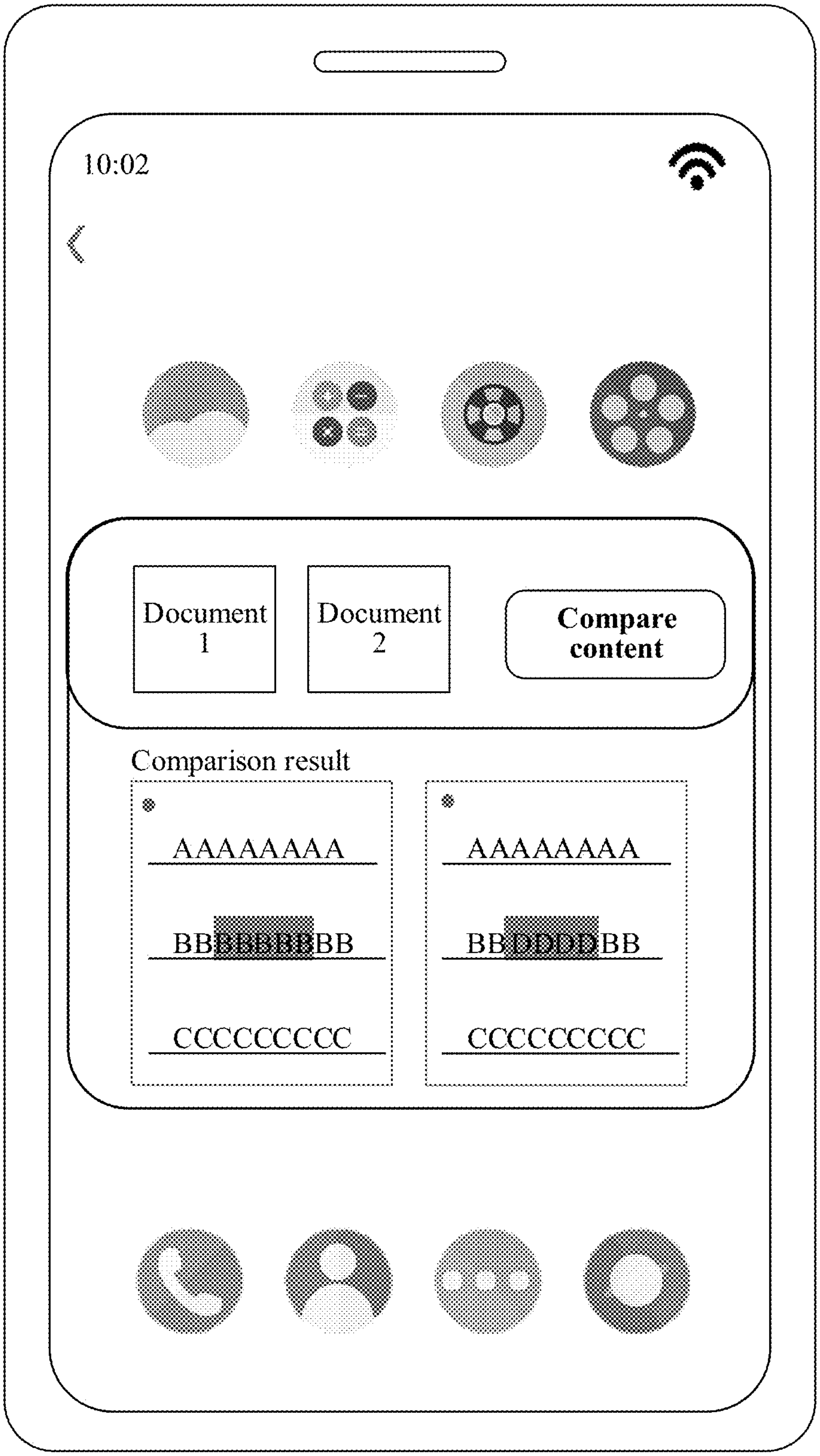

For example, when information-to-be-matched is a text, as shown in FIG. 5B, icons of two documents-to-be-matched can be added as desktop functional components respectively, and an instruction for information matching of a user can be obtained. In response to the instruction for information matching, information in the documents corresponding to the document icons is matched, and a matching result of the document information is displayed in a display component. In some embodiments, the desktop functional component and the display component configured to display the matching result can be located in the same container or in different containers.

Figure 5C:
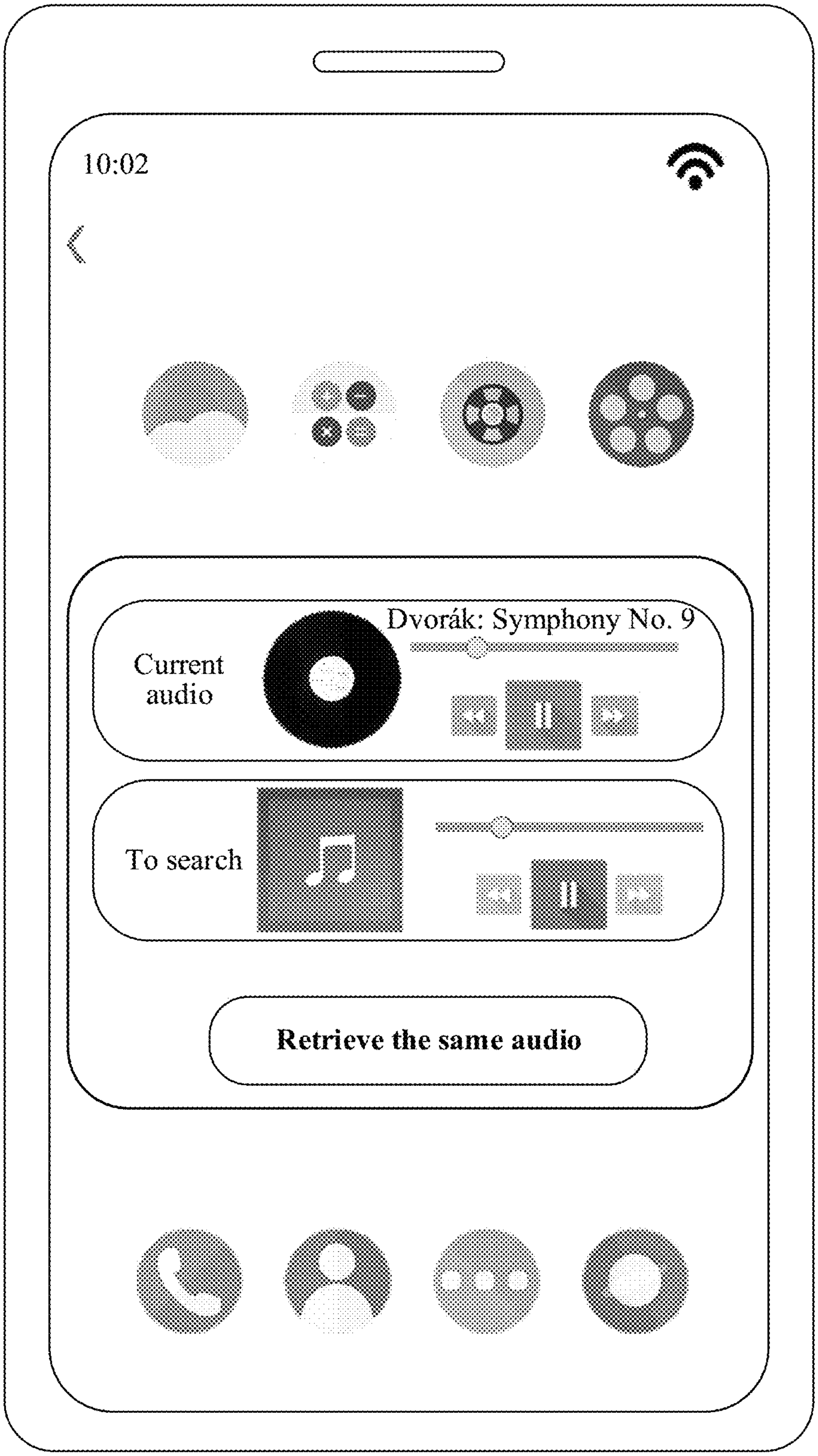

In addition, the information processing method of the present disclosure can also be applied to interaction of various same or similar applications. For example, as shown in FIG. 5C, an audio playing functional module of a first music application and an audio playing functional module of a second music application can be set as desktop components, respectively. When the first music application plays a song, a user can selectively search for the same audio in the desktop functional component, so that the user terminal can search for the song being played by the first music application through a network and play the same song in the second music application. In many cases, different music player applications have different music libraries. The same song may have multiple versions. Different resources may be possibly obtained according to different membership levels of the user in all applications. By searching for a song using the method shown in FIG. 5C, the user can obtain a desired song more conveniently.

Figure 5D:
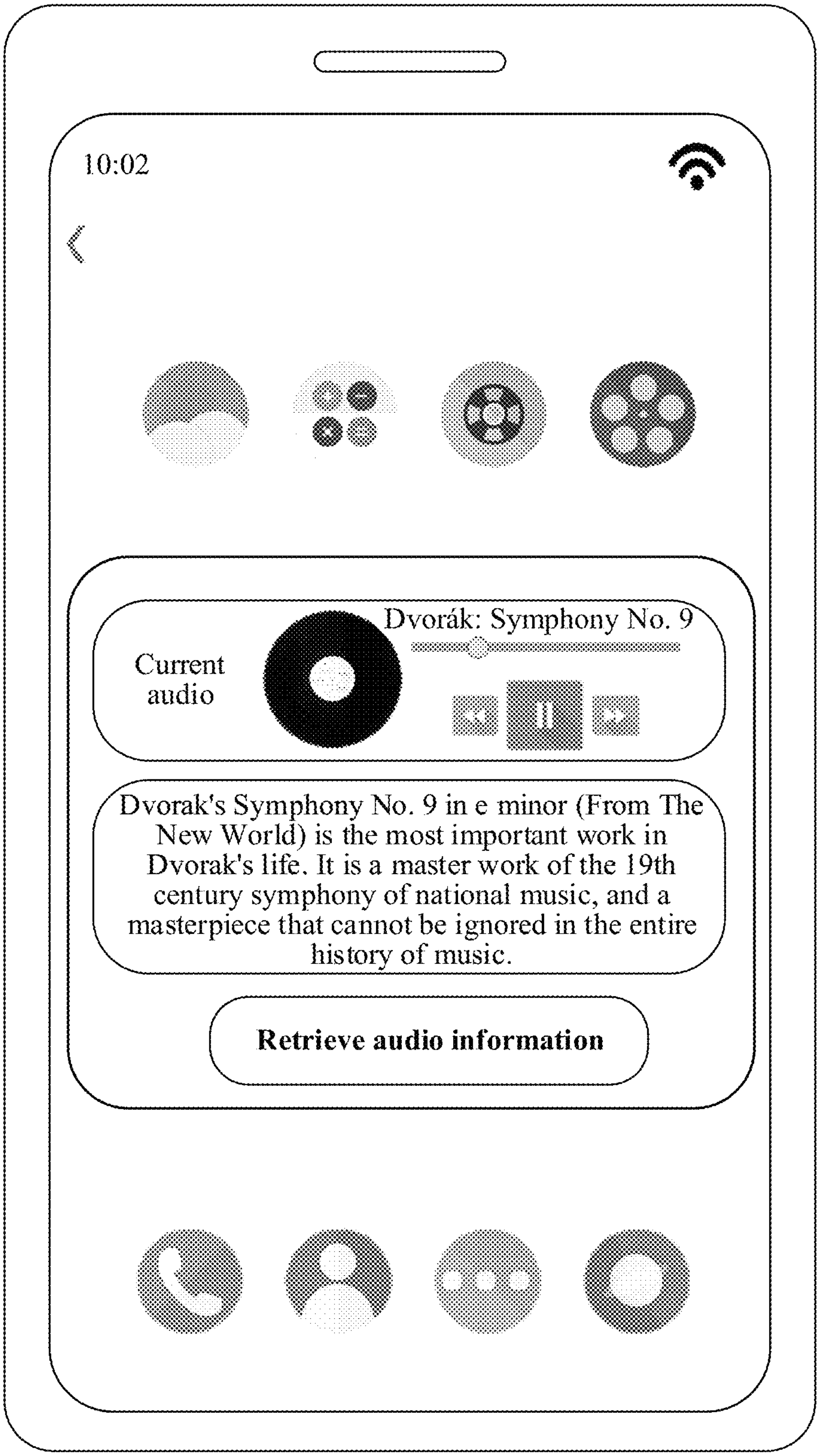

In addition, the information processing method of the present disclosure can also be applied to interactions of various different applications. For example, the content information indicated by the first functional module of the first application is obtained from the first functional component; the content information indicated by the first functional module of the first application is retrieved through the second functional component; and a retrieval result of the retrieval is outputted and is taken as the matching result. For example, as shown in FIG. 5D, an audio playing functional module of a music application and a retrieval functional module of a browser application can be respectively set as desktop components. When the music application plays a song, a user can select to search for information of the song in the desktop functional component, so that the user terminal can retrieve the song being played by the music application through a network and display the information of the song in the browser. In a traditional operation mode, a user needs to manually record the information of a song and then search in the browser. Through the information processing method of the present disclosure, a user does not need to open multiple applications separately, but can directly achieve information interaction and/or function interaction of the multiple applications in the desktop functional component, which improves the user experience.

Figure 6:
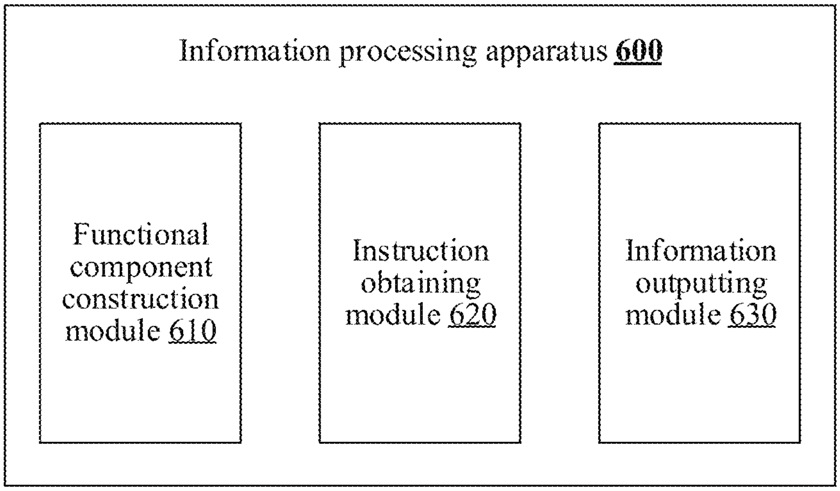
FIG. 6 illustrates a schematic diagram of constitution of an information processing apparatus according to an embodiment of the present disclosure.

FIG. 6 illustrates a schematic diagram of constitution of an information processing apparatus according to an embodiment of the present disclosure.

According to the embodiments of the present disclosure, the information processing apparatus 600 may include a functional-component construction module 610, an instruction obtaining module 620, and an information outputting module 630.

The functional-component construction module 610 may be configured to: generate a first functional component for a first functional module of a first application to cause the first functional component to include first information of the first functional module, and generate a second functional component for a second functional module of a second application to cause the second functional component to include second information of the second functional module.

It is understood that the first functional component and the second functional component are different functional components of the same application; or the first functional component and the second functional component are functional components of different applications.

The instruction obtaining module 620 may be configured to obtain an instruction used for matching the first functional component with the second functional component.

A user terminal can match the first functional component with the second functional component in response to the instruction for matching the first functional component with the second functional component. Or, the user terminal can send information of the first functional component and information of the second functional component to a network server in response to the instruction for matching the first functional component with the second functional component, so as to match the first functional component with the second functional component.

The information outputting module 630 may be configured to output a matching result corresponding to the instruction.

In some embodiments, the matched information may be the first information displayed by the first functional component and the second information displayed by the second functional component. The user terminal outputs, in response to the instruction for matching the first functional component with the second functional component, the matching result between the first information displayed by the first functional component and the second information displayed by the second functional component. Or, the matched information may be information in databases separately corresponding to the first functional component and the second functional component. The user terminal outputs, in response to the instruction for matching the first functional component with the second functional component, the matching result between the first information in the database corresponding to the first functional component and the second information in the database corresponding to the second functional component.

In some embodiments, the information processing apparatus applied to the user terminal 600 may also include an information matching module, configured to perform information matching on the first information of the first functional module of the first application corresponding to the first functional component and the second information of the second functional module of the second application corresponding to the second functional component.

For example, the first information of the first functional module of the first application and the second information of the second functional module of the second application may contain associated information for comparison. In response to an instruction used for comparing the first functional component with the second functional component, a comparison result between the first information of the first functional module of the first application corresponding to the first functional component and the second information of the second functional module of the second application corresponding to the second functional component is outputted.

In some embodiments, the information processing apparatus 600 applied to the user terminal may also include an information matching module, configured to perform information matching on content information indicated by the first functional module of the first application corresponding to the first functional component and content information indicated by the second functional module of the second application corresponding to the second functional component.

For example, the information processing apparatus 600 applied to the user terminal may also obtain the content information indicated by the first functional module of the first application from the first functional component; retrieve, through the second functional component, the content information indicated by the first functional module of the first application; and output a retrieval result of the retrieval, and take the retrieval result as the matching result between the first functional component and the second functional component. In this case, the second functional component may be a browser functional component, and the content information indicated by the first functional module of the first application may be at least one of a text, an image, an audio, and multimedia information.

Figure 7:
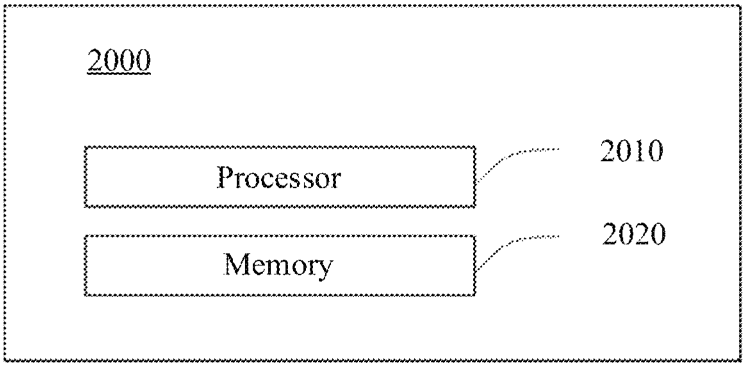
FIG. 7 illustrates a schematic diagram of a user terminal according to an embodiment of the present disclosure.

According to another aspect of the present application, a user terminal is further provided. FIG. 7 illustrates a schematic diagram of a user terminal 2000 according to an embodiment of the present disclosure.

As shown in FIG. 7, the user terminal 2000 may include one or more processors 2010 and one or more memories 2020. The memory 2020 stores a computer-readable code, and the computer-readable code, when run on the one or more processors 2010, may perform the above-mentioned method.

The processor in the embodiments of the present disclosure may be an integrated circuit chip, which has a signal processing capability. The foregoing processor may be a general purpose processor, a digital signal processor (DSP), an application-specific integrated circuit (ASIC), a field programmable gate array (FPGA), or another programmable logical device, a discrete gate or transistor logical device, and a discrete hardware component, and may implement or perform the methods, steps, and logic block diagrams that are disclosed in the embodiments of this application. The general-purpose processor may be a microprocessor, any suitable processor, or the like. The general-purpose processor may be an X86 architecture or an ARM architecture.

Generally, the various exemplary embodiments the present disclosure can be implemented in hardware or dedicated circuits, software, firmware, logic, or any combination thereof. Some aspects can be implemented in hardware, while others can be implemented in firmware or software that can be executed by controllers, microprocessors, or other computing devices. When various aspects of the embodiments of the present disclosure are illustrated or described as block diagrams, flowcharts, or some other graphical representations, it will be understood that the blocks, apparatuses, systems, techniques, or methods described herein can be implemented as non-limiting examples in hardware, software, firmware, a dedicated circuit or logic, general hardware, a controller, other computing devices, or some combinations thereof.

Figure 8:
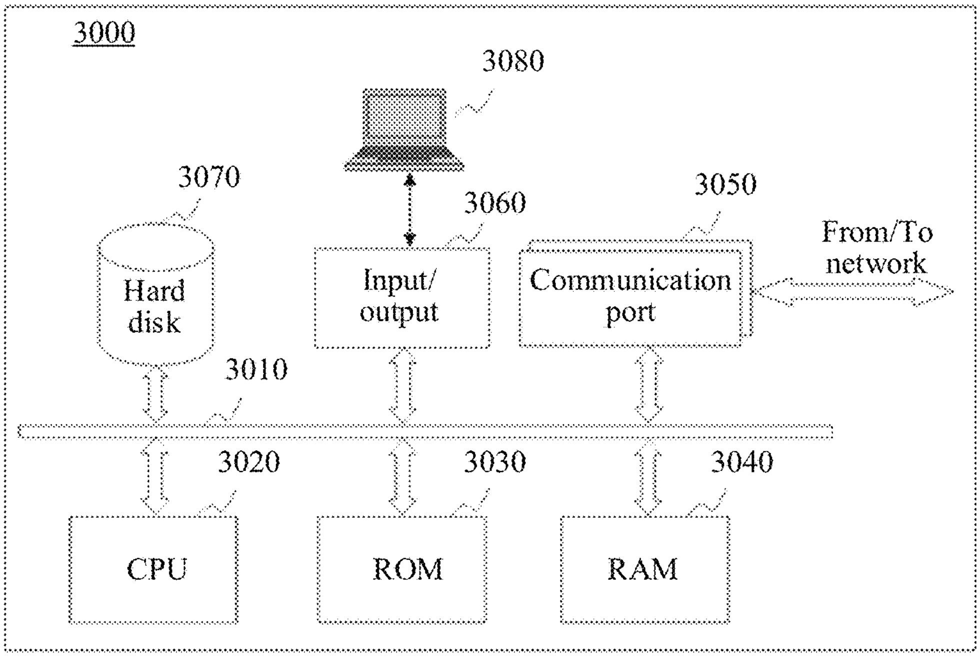
FIG. 8 illustrates an architecture of a computing device according to an embodiment of the present disclosure.

For example, the method or apparatus according to the embodiments of the present disclosure can also be implemented with architecture of a computing device 3000 shown in FIG. 8. As shown in FIG. 8, the computing device 3000 can include a bus 3010, one or more central processing units (CPUs) 3020, a read-only memory (ROM) 3030, a random-access memory (RAM) 3040, a communication port 3050 connected to a network, an input/output component 3060, a hard disk 3070, and the like. A storage device, such as the ROM 3030 or the hard disk 3070, in the computing device 3000 can store various data or files used for processing and/or communication of the methods provided in the present disclosure, as well as program instructions executed by the CPUs. The computing device 3000 can also include a user interface 3080. Of course, the architecture shown in FIG. 8 is only exemplary. During implementation of different devices, one or more components in the computing device shown in FIG. 8 can be omitted according to actual needs.

Figure 9:
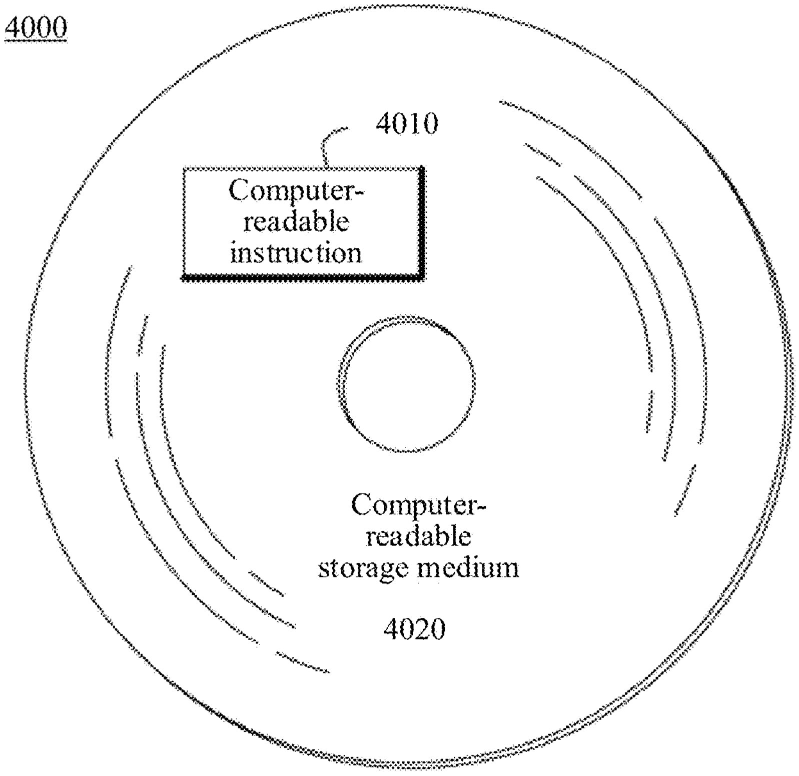
FIG. 9 illustrates a schematic diagram of a storage medium according to an embodiment of the present disclosure.

According to another aspect of the present disclosure, a computer-readable storage medium is further provided. FIG. 9 illustrates a schematic diagram 4000 of a storage medium according to the present disclosure.

As shown in FIG. 9, the computer-readable storage medium 4020 stores computer-readable instructions 4010. The computer-readable instructions 4010, when executed by a processor, may perform the method according to the embodiments of the present disclosure described with reference to the foregoing accompanying drawings. The computer-readable storage medium in the embodiments of the present disclosure may be a volatile memory or a nonvolatile memory, or may include both a volatile memory and a nonvolatile memory. The nonvolatile memory may include a ROM, a programmable ROM (PROM), an electrically programmable ROM (EPROM), an electrically erasable programmable ROM (EEPROM), or a flash memory. The volatile memory may include a RAM, which is used as an external cache. Through illustrative but non-restrictive description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), and a direct rambus RAM (DRRAM), are available. The memory in the method described herein includes but is not limited to these memories and any other suitable types. The memory in the method described herein includes but is not limited to these memories and any other suitable types.

The embodiments of the present disclosure further provide a computer program product or a computer program. The computer program product or computer program includes computer instructions which are stored in a computer-readable storage medium. A processor of a computer device reads the computer instructions from the computer-readable storage medium and executes the computer instructions, causing the computer device to implement the method according to the embodiments of the present disclosure.

In summary, the embodiments of the present disclosure provide an information processing method and apparatus applied to a user terminal, a user terminal, a computer program product, and a storage medium. The information processing method provided in the present disclosure includes: setting a first functional module of a first application as a first functional component to cause the first functional component to include information of the first functional module of the first application; setting a second functional module of a second application as a second functional component to cause the second functional component to include information of the second functional module of the second application; receiving an instruction used for matching the first functional component with the second functional component; and outputting a matching result corresponding to the instruction.

The information processing method of the present disclosure provides interfaces for diversified processing of information in applications and mutual interaction between all the applications, so that a user can quickly complete information matching between all the applications without switching between the applications, thereby achieving information interaction between multiple applications and effectively improving the user experience.

The flowcharts and block diagrams in the accompanying drawings illustrate suitable system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes at least one executable instruction used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It should also be noted that, each block in a block diagram and/or a flowchart and a combination of blocks in the block diagram and/or the flowchart may be implemented by using a dedicated hardware-based system configured to perform a specified function or operation, or may be implemented by using a combination of dedicated hardware and a computer instruction.

The present disclosure uses specific terms to describe embodiments of the present disclosure. For example, "first/second embodiment", "an embodiment", and/or "some embodiments" refer to a certain feature, structure, or characteristic related to at least one embodiment of the present disclosure. Therefore, it is emphasized that two or more references to "an embodiment" or "one embodiment" or "an alternative embodiment" at different positions in this specification do not necessarily refer to the same embodiment. In addition, certain features, structures, or characteristics in one or more embodiments of the present disclosure may be appropriately combined.

Unless otherwise defined, all terms (including technical and scientific terms) used herein have the same meaning as commonly understood by a person of ordinary skill in the art to which the present disclosure belongs. It is further understood that, the terms such as those defined in commonly used dictionaries are interpreted as having meanings that are consistent with the meanings in the context of the related art, and are not interpreted in an idealized or extremely formalized sense, unless expressively so defined herein.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory) Likewise, a processor (or processors and memory) can be used to implement one or more modules. Moreover, each module can be part of an overall module that includes the functionalities of the module.

The above is a description of the present disclosure, and is not considered as a limitation on the present disclosure. Although several exemplary embodiments of the present disclosure are described, a person skilled in the art may easily understand that many changes can be made to the exemplary embodiments without departing from novel teaching and advantages of the present disclosure. Therefore, all these changes are included within the scope of the present disclosure as defined by the claims. It is understood that the above is a description of the present disclosure, and is not considered to be limited by the disclosed specific embodiments, and modifications to the disclosed embodiments and other embodiments fall within the scope of the appended claims. The present disclosure is subject to the claims and equivalents thereof.

What is claimed is:

1. An information processing method performed by a user terminal, the user terminal comprising at least one processor and a touch screen coupled to the at least one processor, the method comprising:

generating, by the at least one processor and in response to a first user operation of adding, to a desktop interface or a homepage interface of the user terminal, a human-computer interface widget corresponding to a first application installed on the user terminal, a first functional component for a first functional module of the first application, the first functional component comprising first information of the first functional module;

generating, by the at least one processor and in response to a second user operation of adding, to the desktop interface or the homepage interface of the user terminal, a human-computer interface widget corresponding to a second application installed on the user terminal, a second functional component for a second functional module of the second application, the second functional component comprising second information of the second functional module, wherein the first user operation and the second user operation are performed on the touch screen, and the first and second functional components are desktop functional components of the user terminal that are detached from the first and second applications and exist independently in a user interface of the user terminal;

simultaneously displaying, directly on the desktop interface or the homepage interface of the touch screen, the first functional component and the second functional component;

detecting, by the at least one processor and without opening the first application or the second application, an instruction for matching the first functional component with the second functional component, the instruction being a touch gesture performed on the desktop interface or the homepage interface of the touch screen and directed to at least one of the first functional component or the second functional component;

generating, in response to the instruction, a container configured to display content of the first functional component, content of the second functional component, and a matching confirmation control;

replacing display of the first functional component and the second functional component by displaying the container on the desktop interface or the homepage interface; and displaying, on the desktop interface or the homepage interface of the touch screen in response to the matching confirmation control being triggered, a matching result corresponding to the instruction in the container.

2. The information processing method according to claim 1, further comprising:

performing a matching operation on the first information and the second information in response to the instruction to obtain the matching result.

3. The information processing method according to claim 1, wherein detecting the instruction for matching the first functional component with the second functional component comprises:

determining, upon detecting a dragging operation for at least partially overlapping a region corresponding to the first functional component in a user interface with a region corresponding to the second functional component in the user interface, that the instruction for matching the first functional component with the second functional component is detected.

4. The information processing method according to claim 2, wherein the first information of the first functional module of the first application and the second information of the second functional module of the second application contain associated information for comparison; and performing the matching operation on the first information and the second information to obtain the matching result comprises:

comparing the first information with the second information to obtain the matching result.

5. The information processing method according to claim 2, wherein the first functional module is a first shopping cart of a first shopping application; the second functional module is a second shopping cart of a second shopping application; the first information comprises at least one item in the first shopping cart; the second information comprises at least one item in the second shopping cart; and performing the matching operation on the first information and the second information to obtain the matching result comprises: matching the item in the first information with the item in the second information to obtain a matching result of the items.

6. The information processing method according to claim 5, further comprising:

correspondingly displaying matched items between the first functional component and the second functional component, and highlighting a preferred item among the matched items, the preferred item being determined based on prices and/or reviews of the matched items.

7. The information processing method according to claim 6, further comprising:

displaying a selection-deletion control in response to existing of the matched items, the selection-deletion control being used for deleting a non-preferred item from the matched items in the first shopping cart or the second shopping cart; and/or displaying a payment selection control in response to the existing of the matched items, the payment selection control being used for paying the preferred item among the matched items in the first shopping cart or the second shopping cart.

8. The information processing method according to claim 1, wherein the container further comprises a functional-component adding control for adding, to the container, a new functional component for matching;

the container is configured to accommodate the first functional component, the second functional component, and the new functional component, and the matching confirmation control confirms to perform matching of the first functional component, the second functional component, and the new functional component.

9. The information processing method according to claim 1, further comprising:

performing information matching on content information indicated by the first functional module of the first application corresponding to the first functional component and content information indicated by the second functional module of the second application corresponding to the second functional component.

10. The information processing method according to claim 9, further comprising:

obtaining, from the first functional component, the content information indicated by the first functional module of the first application;

retrieving, through the second functional component, the content information indicated by the first functional module of the first application; and outputting a retrieval result, and using the retrieval result as the matching result between the first functional component and the second functional component, the second functional component being a browser functional component, and the content information indicated by the first functional module of the first application being at least one of a text, an image, an audio, and multimedia information.

11. The information processing method according to claim 1, wherein in response to the first application and the second application being a same application, the first functional component and the second functional component are different functional components of the same application; or the first functional component and the second functional component are functional components of different applications.

12. The information processing method according to claim 2, wherein performing the matching operation on the first information and the second information in response to the instruction to obtain the matching result comprises:

performing, by the user terminal, the matching operation on the first information and the second information in response to the instruction to obtain the matching result; or, transmitting, by the user terminal, the first information and the second information to a network server in response to the instruction for matching the first functional component with the second functional component, thereby matching the first information with the second information to obtain the matching result.

13. The information processing method according to claim 1, wherein performing the matching operation on the first information and the second information in response to the instruction to obtain the matching result comprises:

performing, in response to the instruction, information matching on the first information displayed by the first functional component and the second information displayed by the second functional component, so as to obtain the matching result; or performing, in response to the instruction, information matching on the first information in a database corresponding to the first functional component and second information in a database corresponding to the second functional component, so as to obtain the matching result.

14. A user terminal, comprising:

a touch screen;

one or more processors; and one or more memories, storing a computer-executable program that, when being executed, causes the one or more processors to perform:

generating, by the at least one processor and in response to a first user operation of adding, to a desktop interface or a homepage interface of the user terminal, a human-computer interface widget corresponding to a first application installed on the user terminal, a first functional component for a first functional module of the first application, the first functional component comprising first information of the first functional module;

generating, by the at least one processor and in response to a second user operation of adding, to the desktop interface or the homepage interface of the user terminal, a human-computer interface widget corresponding to a second application installed on the user terminal, a second functional component for a second functional module of the second application, the second functional component comprising second information of the second functional module, wherein the first user operation and the second user operation are performed on the touch screen, and the first and second functional components are desktop functional components of the user terminal that are detached from the first and second applications and exist independently in a user interface of the user terminal;

simultaneously displaying, directly on the desktop interface or the homepage interface of the touch screen, the first functional component and the second functional component;

detecting, by the at least one processor and without opening the first application or the second application, an instruction for matching the first functional component with the second functional component, the instruction being a touch gesture performed on the desktop interface or the homepage interface of the touch screen and directed to at least one of the first functional component or the second functional component;

generating, in response to the instruction, a container configured to display content of the first functional component, content of the second functional component, and a matching confirmation control:

replacing display of the first functional component and the second functional component by displaying the container on the desktop interface or the homepage interface; and displaying, on the desktop interface or the homepage interface of the touch screen in response to the matching confirmation control being triggered, a matching result corresponding to the instruction in the container.

15. The user terminal according to claim 14, wherein the one or more processors are further configured to perform:

determining, upon detecting a dragging operation for at least partially overlapping a region corresponding to the first functional component in a user interface with a region corresponding to the second functional component in the user interface, that the instruction for matching the first functional component with the second functional component is detected.

16. A non-transitory computer-readable storage medium, storing a computer-executable instruction that, when being executed, causes one or more processors of a user terminal to perform:

generating, by the at least one processor and in response to a first user operation of adding, to a desktop interface or a homepage interface of the user terminal, a human-computer interface widget corresponding to a first application installed on the user terminal, a first functional component for a first functional module of the first application, the first functional component comprising first information of the first functional module;

generating, by the at least one processor and in response to a second user operation of adding, to the desktop interface or the homepage interface of the user terminal, a human-computer interface widget corresponding to a second application installed on the user terminal, a second functional component for a second functional module of the second application, the second functional component comprising second information of the second functional module, wherein the first user operation and the second user operation are performed on the touch screen, and the first and second functional components are desktop functional components of the user terminal that are detached from the first and second applications and exist independently in a user interface of the user terminal;

simultaneously displaying, directly on the desktop interface or the homepage interface of the touch screen, the first functional component and the second functional component;

detecting, by the at least one processor and without opening the first application or the second application, an instruction for matching the first functional component with the second functional component, the instruction being a touch gesture performed on the desktop interface or the homepage interface of the touch screen and directed to at least one of the first functional component or the second functional component;

generating, in response to the instruction, a container configured to display content of the first functional component, content of the second functional component, and a matching confirmation control;

replacing display of the first functional component and the second functional component by displaying the container on the desktop interface or the homepage interface; and displaying, on the desktop interface or the homepage interface of the touch screen in response to the matching confirmation control being triggered, a matching result corresponding to the instruction in the container.

17. The method according to claim 1, wherein:

in response to that the first application and the second application are shopping applications, the matching result comprises a shopping item that exist in both shopping carts of the first and second applications;

in response to that the first application and the second application are document processing applications, the matching result comprises a comparison result between a first document in the first application and a second document in the second application; and in response to that the first application and the second application are media playing applications, the matching result comprises a media that exist in both media libraries of the first and second applications.

* * * * *